United States Patent [19]

Funaya

[11] Patent Number: 5,740,327
[45] Date of Patent: Apr. 14, 1998

[54] METHOD OF AND APPARATUS FOR ROBOT TIP TRAJECTORY CONTROL

[75] Inventor: Koichi Funaya, Tokyo, Japan

[73] Assignee: NEC Corporation, Tokyo, Japan

[21] Appl. No.: 578,495

[22] Filed: Dec. 26, 1995

[30] Foreign Application Priority Data

Dec. 27, 1994 [JP] Japan ................................. 6-324564

[51] Int. Cl.$^6$ ........................... G05B 15/00; G05B 19/00
[52] U.S. Cl. ............................................. 395/89; 395/95
[58] Field of Search ............................. 395/89, 95, 96

[56] References Cited

U.S. PATENT DOCUMENTS

| | | | |
|---|---|---|---|
| 4,250,438 | 2/1981 | Onoda | 318/561 |
| 4,506,335 | 3/1985 | Magnuson | 901/20 |
| 4,529,921 | 7/1985 | Moribe | 318/568 |
| 4,554,497 | 11/1985 | Nozawa | 318/636 |
| 4,705,999 | 11/1987 | Soji | 318/568 |
| 4,706,003 | 11/1987 | Nakashima | 318/568 |
| 4,728,872 | 3/1988 | Kishi | 318/568 |
| 4,734,866 | 3/1988 | Bartelt | 901/15 |
| 4,772,831 | 9/1988 | Casler | 901/22 |
| 4,773,025 | 9/1988 | Penkar | 318/568 |
| 4,774,445 | 9/1988 | Penkar | 318/568 |
| 4,819,184 | 4/1989 | Jonsson | 901/3 |
| 4,829,219 | 5/1989 | Penkar | 318/568.18 |
| 4,894,596 | 1/1990 | Hara | 318/568.1 |
| 4,972,131 | 11/1990 | Koiyo | 318/568.1 |
| 4,988,934 | 1/1991 | Toyoda | 318/568.15 |
| 5,004,968 | 4/1991 | Mizuno | 318/615 |
| 5,201,630 | 4/1993 | Ishida | 318/568.18 |
| 5,218,281 | 6/1993 | Sasaki | 318/600 |
| 5,276,383 | 1/1994 | Nishimura | 318/568.15 |
| 5,293,460 | 3/1994 | Nakatsuchi | 395/80 |
| 5,325,467 | 6/1994 | Torii | 395/96 |
| 5,327,523 | 7/1994 | Itoh | 395/95 |
| 5,331,542 | 7/1994 | Ito | 318/568.18 |
| 5,369,568 | 11/1994 | Song | 318/568.11 |
| 5,373,221 | 12/1994 | McGee | 318/568.11 |
| 5,373,439 | 12/1994 | Jeon | 364/167.01 |
| 5,379,367 | 1/1995 | Song | 395/89 |
| 5,386,499 | 1/1995 | Tokita | 395/85 |
| 5,426,722 | 6/1995 | Batchelder | 395/80 |
| 5,434,489 | 7/1995 | Cheng | 318/568.15 |
| 5,467,430 | 11/1995 | Itoh | 395/95 |

FOREIGN PATENT DOCUMENTS

| | | | |
|---|---|---|---|
| 63-010207 | 1/1988 | Japan | G05B 19/403 |
| 63-273107 | 11/1988 | Japan | G05B 19/407 |

OTHER PUBLICATIONS

K. Aoki et al., "High Precision Trajectory Tracking Control using Smoothed Inputs and Multi-Axes Coordination", 35th Joint Meeting of Automatic Controls, pp. 353–356 (1992).

J.Y.S. Luh et al., "Minimum-time along the Path for a Mechanical Arm", Proceedings of 16th Conference of Decision Controls, pp. 755–759 (1977).

S. Cheng et al., "IntelliTrak—A Method of Cartesian Path Control", Proceedings of 24th International Symposium on Industrial Robot, pp. 415–420 (1993).

*Primary Examiner*—Tariq R. Hafiz
*Assistant Examiner*—Jeffrey S. Smith
*Attorney, Agent, or Firm*—Foley & Lardner

[57] ABSTRACT

Acceleration/deceleration processing is performed in industrial robot controls when there is a transit point in an instructed trajectory where the robot tip cannot follow the trajectory with the instructed velocity because of the allowable limit of acceleration of the robot tip. In the invention, for specifying the velocity reduction ratio at the transit point quantitatively and continuously in consideration of tradeoff between the tracking error and the continuity of the traveling speed, a transit velocity or the velocity at the transit point after acceleration/deceleration processing is calculated from a linear combination of two instructed velocities before and after the transit point referring a transit velocity parameter as the velocity reduction ratio. To attain the transit velocity with allowable acceleration, the start point and the end point of acceleration/deceleration processing are determined, and the robot tip is controlled through continuous acceleration/deceleration processing from the transit point to the end point.

6 Claims, 23 Drawing Sheets

FIG. 11
INSTRUCTED TRAJECTORY
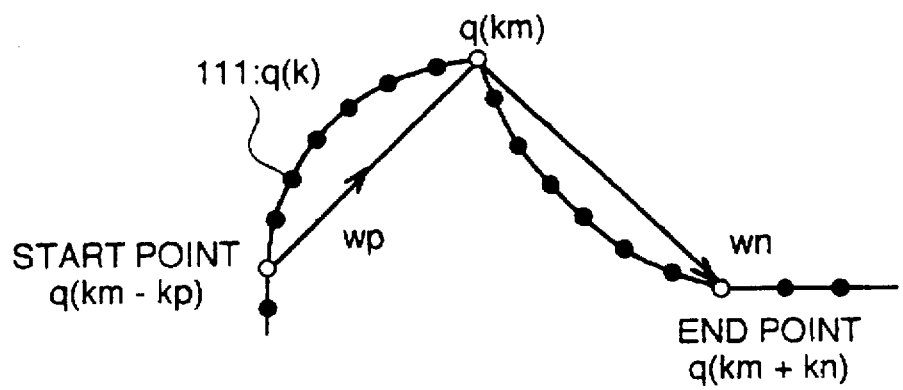
TRAJECTORY AFTER ACCELERATION/DECELERATION PROCESSING
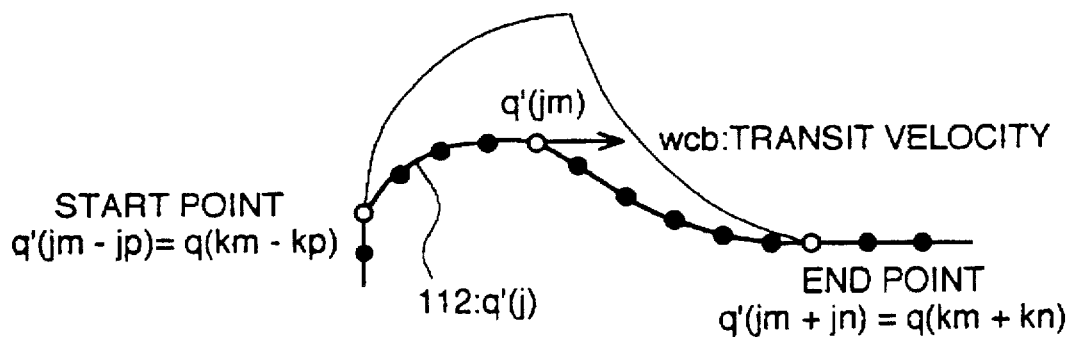

FIG. 13
TRAJECTORY AFTER ACCELERATION/DECELERATION PROCESSING
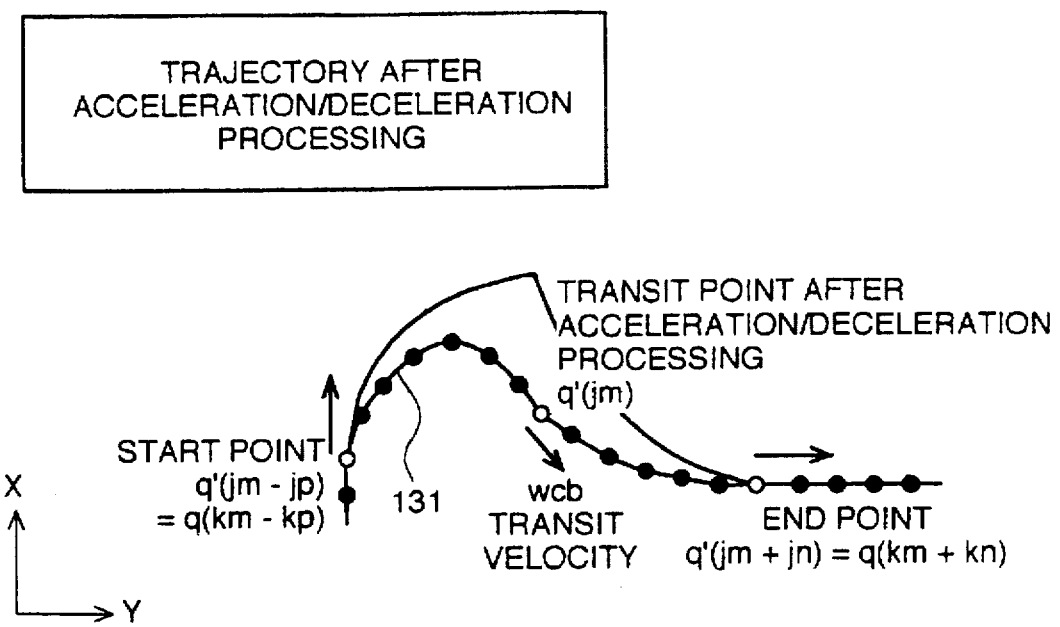
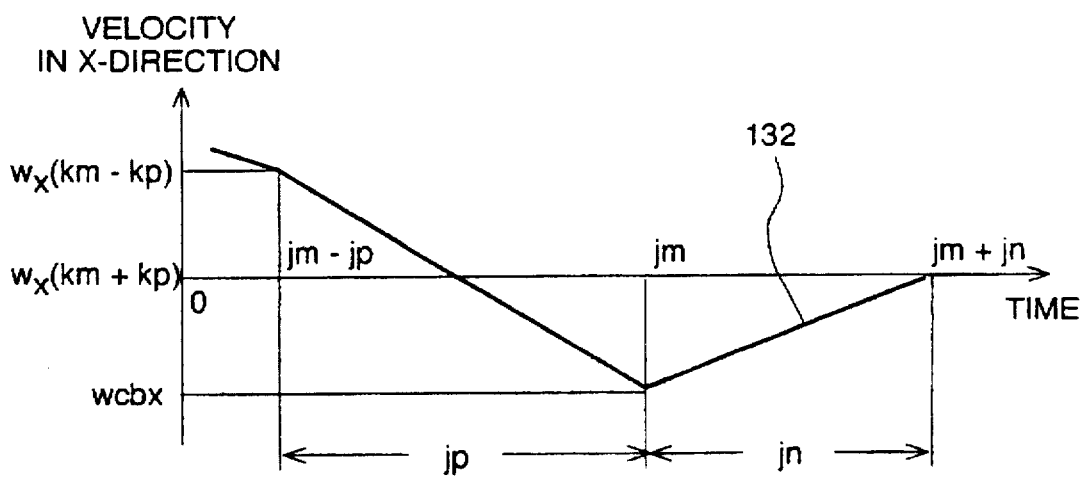
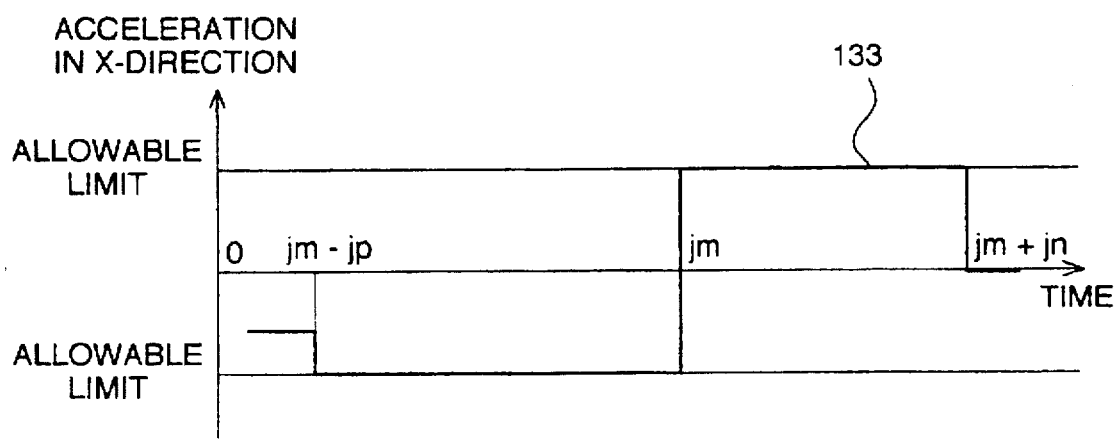

FIG. 17

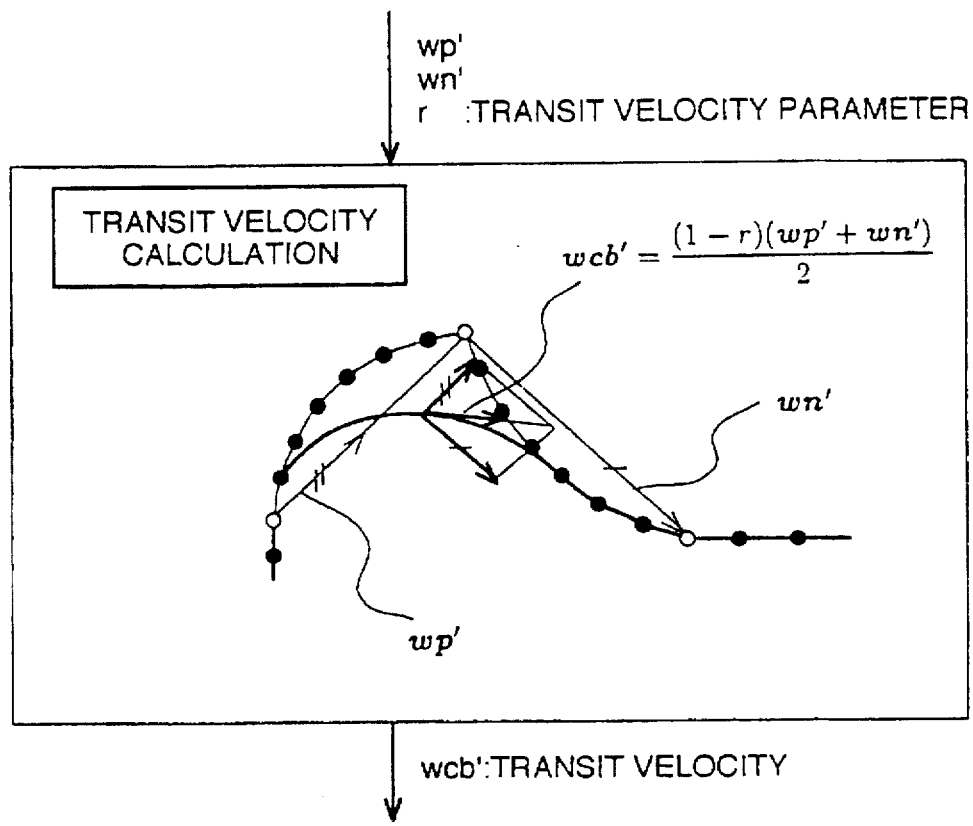

Inputs: wp', wn', r : TRANSIT VELOCITY PARAMETER

TRANSIT VELOCITY CALCULATION $$wcb' = \frac{(1-r)(wp' + wn')}{2}$$

Output: wcb':TRANSIT VELOCITY

FIG. 18

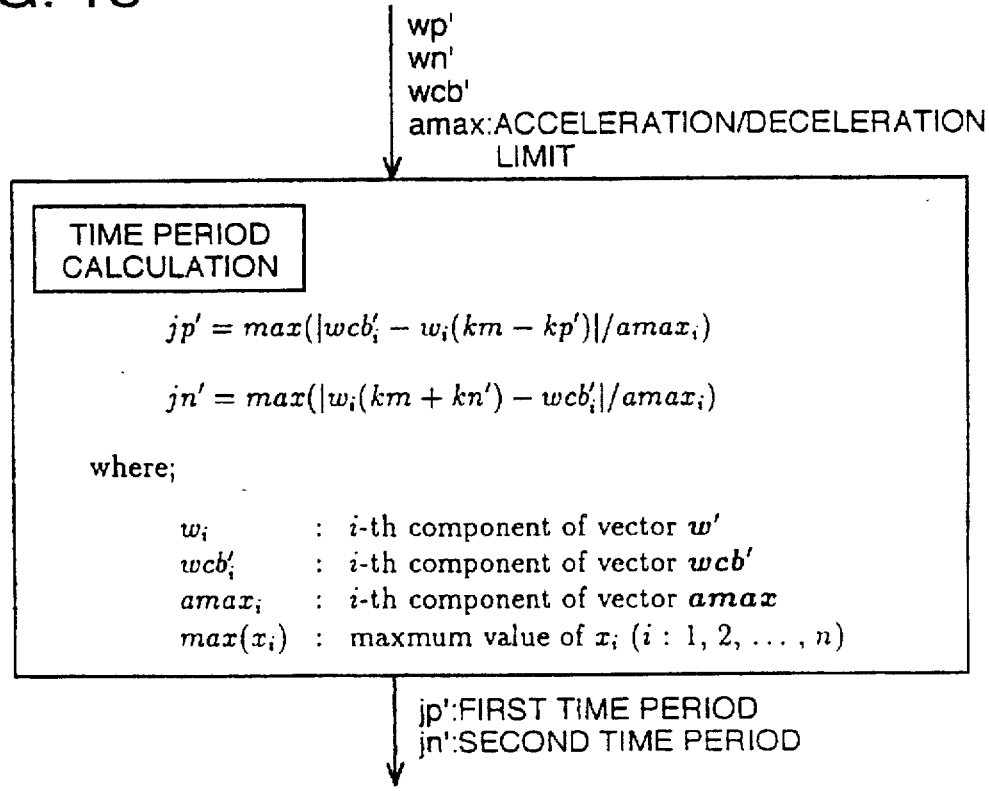

Inputs: wp', wn', wcb', amax:ACCELERATION/DECELERATION LIMIT

TIME PERIOD CALCULATION $$jp' = max(|wcb'_i - w_i(km - kp')|/amax_i)$$

$$jn' = max(|w_i(km + kn') - wcb'_i|/amax_i)$$

where;

- $w_i$ : $i$-th component of vector $w'$
- $wcb'_i$ : $i$-th component of vector $wcb'$
- $amax_i$ : $i$-th component of vector $amax$
- $max(x_i)$ : maxmum value of $x_i$ ($i$ : 1, 2, ..., $n$)

Outputs: jp':FIRST TIME PERIOD, jn':SECOND TIME PERIOD

FIG. 19

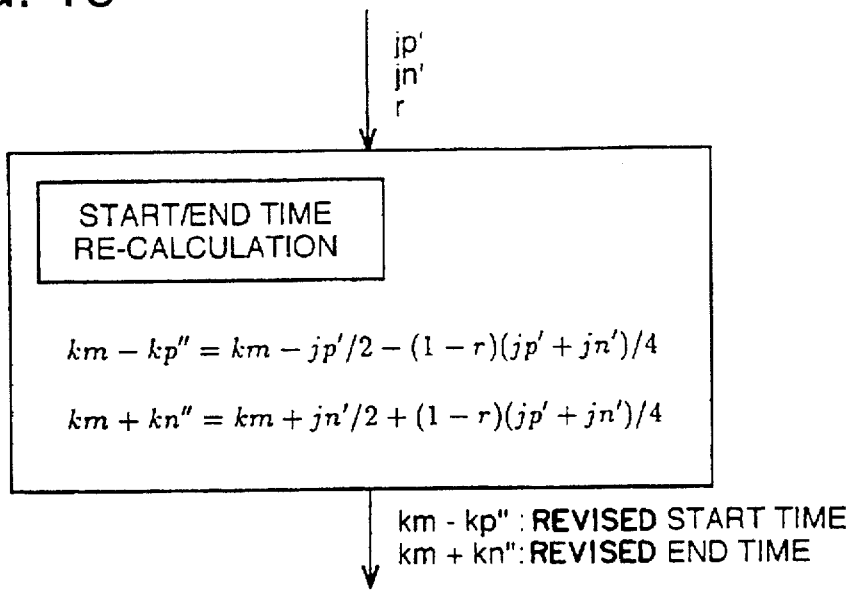

↓ $jp'$, $jn'$, $r$

START/END TIME RE-CALCULATION $$km - kp'' = km - jp'/2 - (1-r)(jp' + jn')/4$$
$$km + kn'' = km + jn'/2 + (1-r)(jp' + jn')/4$$

↓ $km - kp''$ : REVISED START TIME
  $km + kn''$ : REVISED END TIME

FIG. 20

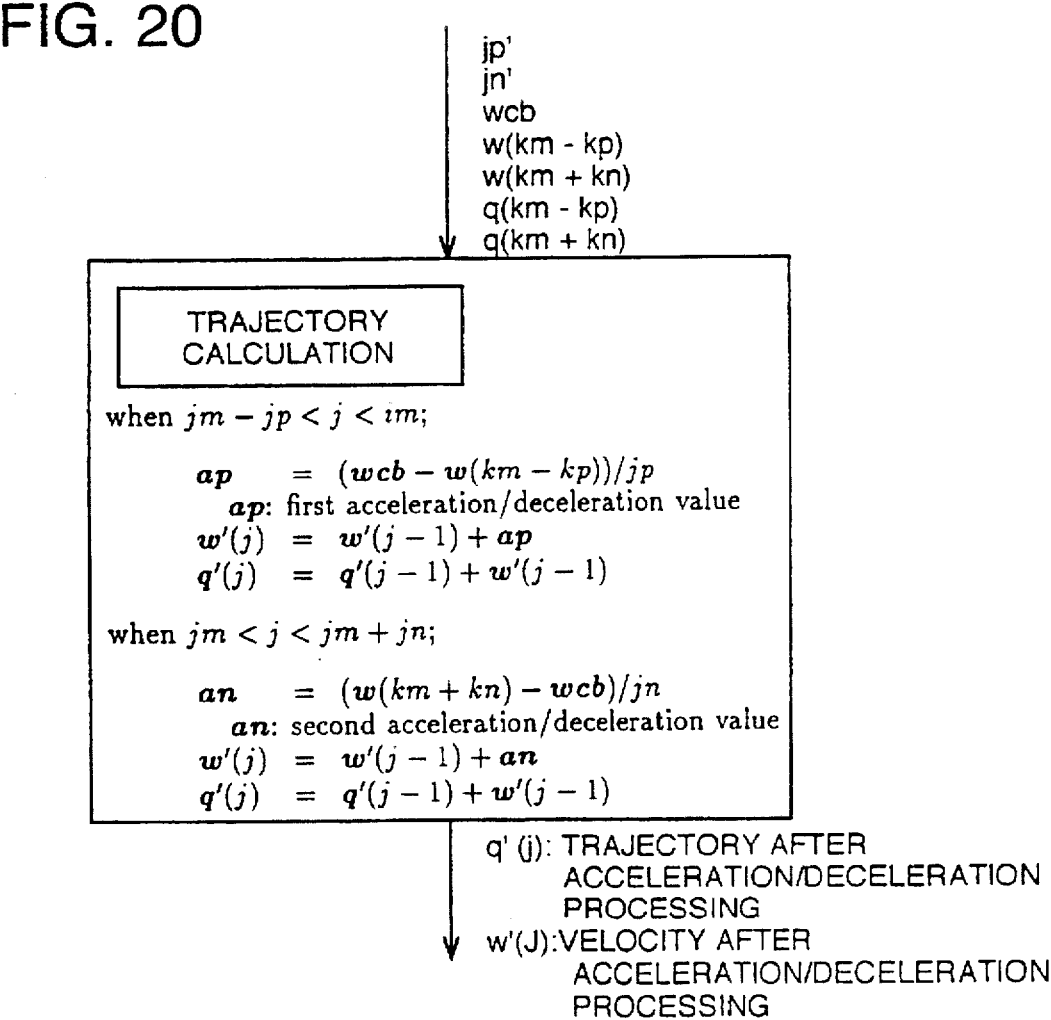

↓ $jp'$, $jn'$, $wcb$, $w(km - kp)$, $w(km + kn)$, $q(km - kp)$, $q(km + kn)$

TRAJECTORY CALCULATION when $jm - jp < j < im$;

$ap = (wcb - w(km - kp))/jp$
  $ap$: first acceleration/deceleration value
$w'(j) = w'(j-1) + ap$
$q'(j) = q'(j-1) + w'(j-1)$ when $jm < j < jm + jn$;

$an = (w(km + kn) - wcb)/jn$
  $an$: second acceleration/deceleration value
$w'(j) = w'(j-1) + an$
$q'(j) = q'(j-1) + w'(j-1)$ ↓ $q'(j)$: TRAJECTORY AFTER ACCELERATION/DECELERATION PROCESSING
  $w'(J)$: VELOCITY AFTER ACCELERATION/DECELERATION PROCESSING Inputs: wp', wn', r', rp,rn:COEFFICIENTS

TRANSIT VELOCITY CALCULATION $$wcb' = (1-r)(rp \cdot wp' + rn \cdot wn')$$

Output: wcb'

Inputs: jp', jn', r, rp,rn

START/END TIME RE-CALCULATION $$km - kp'' = km - jp'/2 - (1-r)rp(jp' + jn')/4$$

$$km + kn'' = km + jn'/2 + (1-r)(jp' + jn')/4$$

Outputs: km - kp'', km + kn''

FIG. 27

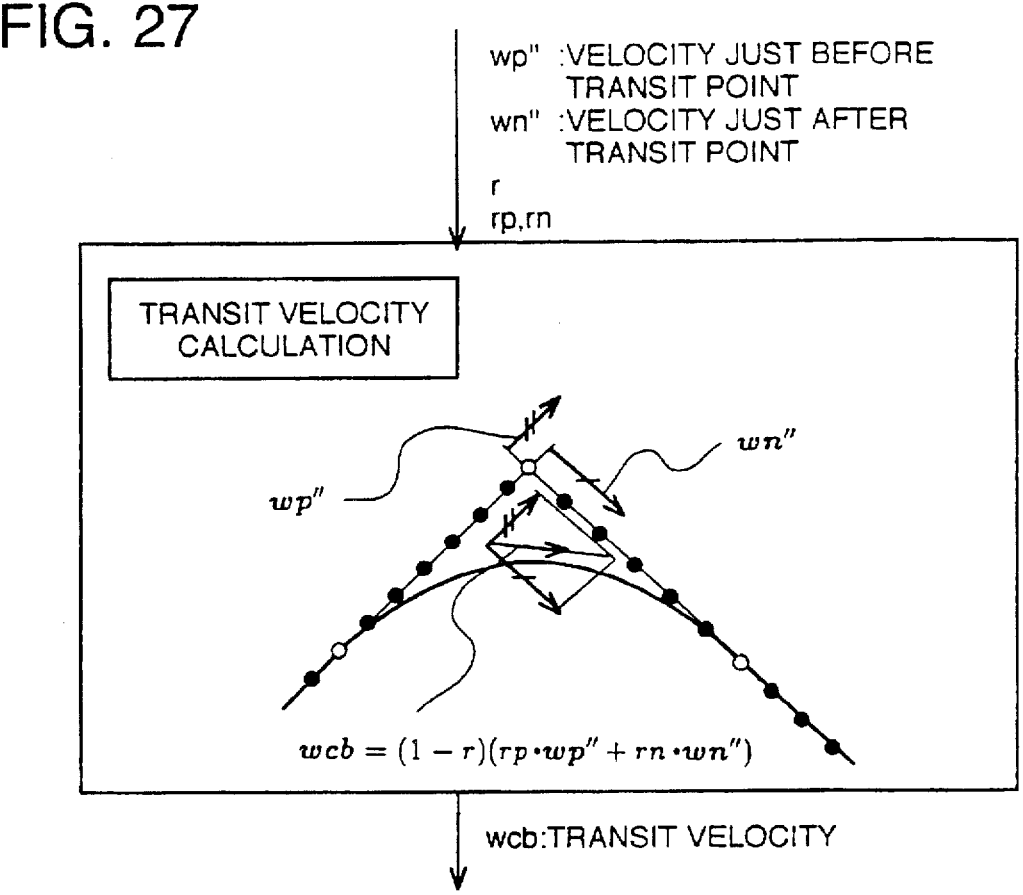

- wp″ : VELOCITY JUST BEFORE TRANSIT POINT
- wn″ : VELOCITY JUST AFTER TRANSIT POINT
- r
- rp, rn

TRANSIT VELOCITY CALCULATION $$wcb = (1 - r)(rp \cdot wp'' + rn \cdot wn'')$$

wcb: TRANSIT VELOCITY

FIG. 28

- wp″
- wn″
- wcb
- amax

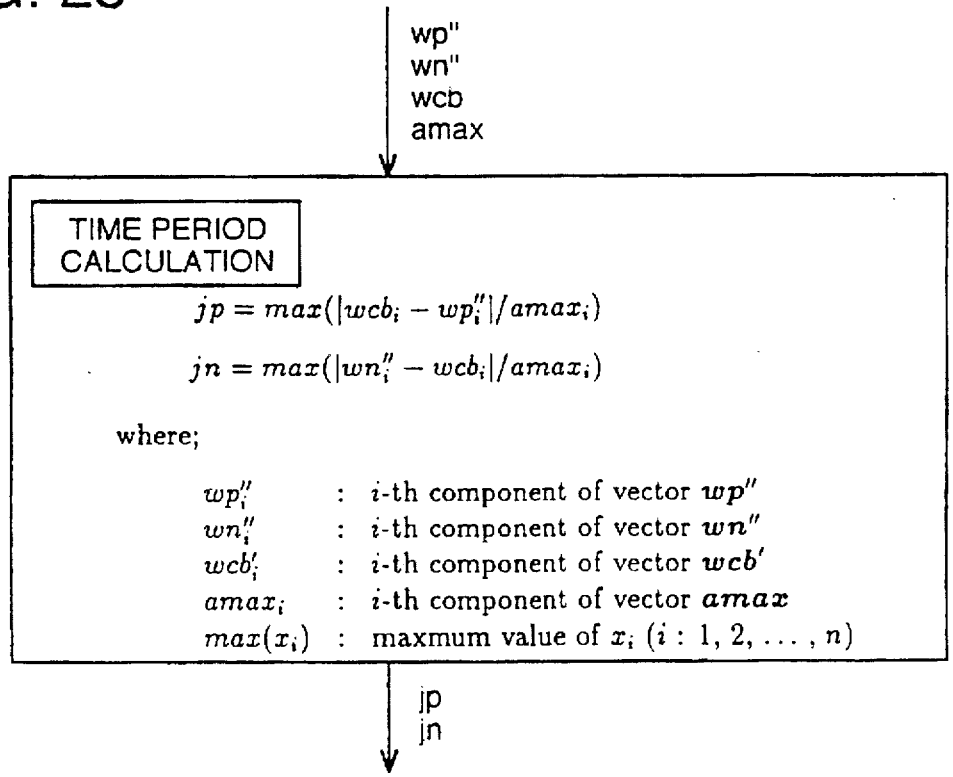

TIME PERIOD CALCULATION $$jp = max(|wcb_i - wp''_i|/amax_i)$$

$$jn = max(|wn''_i - wcb_i|/amax_i)$$

where;

- $wp''_i$ : $i$-th component of vector $wp''$
- $wn''_i$ : $i$-th component of vector $wn''$
- $wcb'_i$ : $i$-th component of vector $wcb'$
- $amax_i$ : $i$-th component of vector $amax$
- $max(x_i)$ : maximum value of $x_i$ ($i$ : 1, 2, ..., n)

jp
jn

METHOD OF AND APPARATUS FOR ROBOT TIP TRAJECTORY CONTROL

BACKGROUND OF THE INVENTION

This invention relates to robot controls and more particularly to robot controls for controlling industrial robots used in an assembling or processing stage of manufacturing plants.

In robot controls, a robot tip is commanded to follow an instructed trajectory.

The instructed trajectory is transformed to motions of multiple axes of the robot, and each axis is controlled by a motor. In some cases, however, at a transit point, a motor driving an axis is required to produce acceleration which the motor is not capable of producing. In these cases, the robot tip cannot follow the instructed trajectory. So, acceleration/deceleration processing is introduced, wherein the instructed trajectory is altered to a trajectory which the robot tip is able to follow.

Some methods of the acceleration/deceleration processing have been proposed.

For example, Aoki et al., disclosed "High Precision Trajectory Tracking Control using Smoothed inputs and Multi-Axes Coordination" in a paper of the 35th Joint Meeting of Automatic Controls on October 1992, on pp. 353–356. In this prior art, an acceleration/deceleration processing method for high precision trajectory tracking is proposed. The prior art is described in connection with FIG. 2.

A reference velocity generator 11 generates reference velocities for each axis from an instructed trajectory. Acceleration detectors 12 detect axes where the demanded acceleration calculated from the reference velocity is more than the maximum allowable value for the axis. Inter-axis coordination units 13 calculate a velocity reduction ratio which makes the demanded acceleration for each axis less than the maximum allowable value for the axis. Each reference velocity modifier 14 calculates a modified reference velocity for each axis by dividing each reference velocity delivered from the reference velocity generator 11 with this velocity reduction ratio. Each axis of the robot is controlled with each modified reference velocity delivered from each of the reference velocity modifiers 14.

Thus, in a trajectory of the robot tip shown in FIG. 3, the robot tip is controlled by the reduced velocity v(i)* with minimum tracking error at a transit point p(i), where p(i) is a vector representing the coordinates, in a Cartesian space for example, of the transit point and v(i)* is a vector representing the modified reference velocity at the transit point.

In another prior art disclosed by J. Y. S. Luh et al. on "Minimum-Time along the Path for a Mechanical Arm" in the proceeding of 16th Conference of Decision Controls, December 1977, on pp. 755–759, an allowable tracking error at the transit point is preset, and a velocity profile is generated for minimizing the time required for traveling the whole trajectory. This prior art is described in connection with FIG. 4.

FIG. 4 shows a motion of a joint angle of a robot, where thin straight line segments indicate an instructed motion, and a thick line indicates the motion after acceleration/deceleration processing. The start time t(i)−s(i) and the end time t(i)+s(i) of the acceleration/deceleration processing are determined so as to make the time 2s(i) for travelling the transit point p(i) minimum on condition that the tracking error d(i) at the transit point p(i) is less than a predetermined value e(i). In the notations of FIG. 4, i denotes a sampling point, t(i) is the time instructed to pass the transit point p(i), and p(i), d(i) and e(i) are vectors indicating values of coordinates.

In the prior art described in connection with FIG. 4, the trajectory of the robot tip after the acceleration/deceleration processing is shown in FIG. 5, where d(i) is less than the predetermined value e(i) and the robot tip passes the transit point p(i) in a shortest time.

Still another prior art using filtering circuits for the acceleration/deceleration processing is disclosed, for example, in a Japanese patent application entitled "Robot controller" and laid open as a Provisional Publication No. 273107/'88, or in "IntelliTrak—A Method of Cartesian Path Control" by Cheng et al. on pp. 415–420 of the proceeding of 24th international symposium on Industrial Robot, November 1993, Tokyo. This prior art is described in connection with FIG. 6.

Instructed velocities for axis No. 1 and No. 2 are shown as rectangles in FIG. 6 denoted by 61 and 62 respectively. These velocities include acceleration values larger than the maximum allowable value at the rising and falling edges of the rectangles. The instructed velocities 61 and 62 are processed through a cascade connection of linear filters 65 and 66, for example, and high frequency components of the velocities are attenuated. Velocities at the output of the cascaded connection of the linear filters have no acceleration value larger than the maximum allowable value as shown by 63 and 64.

The axis No. 1 is controlled in accordance with the filtered velocity 63, and the axis No. 2 is controlled in accordance with the filtered velocity 64. Referring to FIG. 7, the robot tip is controlled in a first direction by the axis No. 1 of FIG. 6, and controlled in a second direction by the axis No. 2 of FIG. 6. Instructed trajectory 71 corresponding to instructed velocities 61 and 62 is changed to a trajectory 72 after the filtering process. Error of tracking at the transit point is adjusted by specifying length of integration time in the linear filters 65 and 66.

In a Japanese patent application entitled "Robot control method" and laid open as a Provisional Publication No. 10207/'88, an instructed displacement is smoothed when positioning error at a transit point is amply allowed. Referring to FIG. 8, p(i−1), p(i) and p(i+1) are three transit points on an instructed trajectory. Displacement from i−1 to i is denoted by dp(i), and displacement from i to i+1 is denoted by dp(i+1).

For smoothing the displacements, dp'(i) and dp'(i+1) are calculated with a coefficient $\alpha$ as following equations.

$$dp'(i)=dp(i)+\alpha(dp(i+1)-dp(i))$$

$$dp'(i+1)=dp(i)+(1-\alpha)(dp(i+1)-dp(i))$$

And the transit point p'(i) after acceleration/deceleration processing is represented by $$p'(i)=p(i-1)+dp'(i)=p(i+1)-dp'(i+1)$$

In this prior art, the acceleration/deceleration processing is performed by a simple algorithm of changing transit point p(i) to p'(i).

In any of these prior arts described, the velocity of the robot tip at the transit point cannot be specified. This is inconvenient when robot controls are applied for painting or sealing processes wherein the robot tip is expected to travel at a constant velocity. There arises irregularity of painting, for example, when the robot tip does not travel at a constant velocity. Furthermore, in any of these prior arts, the tracking error at the transit point can not be continuously controlled.

For example, in the prior art of FIG. 2, each axis is controlled with the modified reference velocity which is obtained by reducing the reference velocity so as to minimize the tracking error, and therefore, the modified reference velocity can not be specified.

In the prior art of FIG. 4, the transit point p(i) is passed in a shortest time on condition that the tracking error d(i) is smaller than a predetermined value e(i). Conversely, when e(i) is specified, the velocity at the transit point p(i) may be specified. In practice, however, it is very difficult to calculate and designate all corresponding values of e(i) for specifying velocities at all transit points which have various shapes, and therefore, the prior art of FIG. 4 is not adapted for controlling a robot tip in a constant velocity.

In the prior art of FIG. 6, the velocity at a transit point is determined by the cascaded connection of the linear filters 65, 66, and it is difficult to keep the velocity around the transit point constant. And in this prior art, the tracking error is also determined by the cascaded connection of the linear filters 65, 66 and cannot be controlled to be zero. So, even when a low travelling speed is allowed, the tracking error of the robot tip remains.

In the prior art of FIG. 8, neither the velocity of the movement nor the allowable tracking error can be specified.

SUMMARY OF THE INVENTION

Therefore, a primary object of the present invention is to provide robot controls wherein the velocity at transit points can be specified quantitatively and continuously, in consideration of tradeoff between the tracking error and the travelling speed.

In order to achieve the object, an acceleration/deceleration processor detects a transit point on an instructed trajectory, wherein at least one axis of the robot is required to generate an acceleration value beyond the allowable limit for the axis. When a transit point is detected, the acceleration/deceleration processor determines a transit velocity wcb at the transit point on the trajectory after acceleration/deceleration processing, from a first instructed velocity wp before the transit point and a second instructed velocity wn after the transit point as $$wcb=(1-r)(rp \cdot wp+rn \cdot wn)$$

where, wcb, wp and wn are vector values representing the velocities of the robot tip, and r, rp and rn are parameters referred to by the acceleration/deceleration processor. Coefficients rp and rn represent weight factors of wp and wn for determining the velocity and the direction of movement of the robot tip at the transit point of the trajectory after acceleration/deceleration processing, and a transit velocity parameter r designates the velocity reduction ratio at the transit point.

Then the acceleration/deceleration processor determines the start point and the end point of acceleration/deceleration processing. The start point is calculated so that the robot tip may attain the velocity wcb from the velocity at the start point with a first constant acceleration value, each absolute value of the component for each axis of the first constant acceleration value being within the allowable limit for the axis. The end point is equally calculated so that, from the velocity wcb, the robot tip may attain, at the end point, the same velocity before acceleration/deceleration processing with a second constant acceleration value within the limit.

The transit velocity parameter r is selected from a range $0 \leq r \leq 1$. When r=0 and rp=rn=1/2, wcb=(wp+wn)/2, and the robot tip is controlled in a favorable way for velocity continuation. When r=1, wcb=0, and the robot tip is controlled to follow the instructed trajectory with a minimum tracking error, stopping at the transit point.

In this way, the velocity of a robot tip at a transit point can be controlled quantitatively and continuously, in consideration of tradeoff between the tracking error and the travelling speed.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIG. 11 shows the start point q(km−kp) and the end point q(km+kn) of acceleration/deceleration processing, an average velocity wp before the transit point q(km) and an average velocity wn after the transit point q(km) on an instructed trajectory, and the corresponding transit velocity wcb and the transit point q'(jm) after acceleration/deceleration processing in the embodiment shown in FIG. 1.

FIG. 13 shows the relation between the trajectory of the robot tip after the acceleration/deceleration processing of the instructed trajectory shown in FIG. 12, the corresponding velocity of the axis in the x direction and the corresponding acceleration of the axis after acceleration/deceleration processing in the embodiment of FIG. 1.

FIG. 17 shows a process in the step 208 of FIG. 15.

FIG. 18 shows a process in the step 209 of FIG. 15.

FIG. 19 shows a process in the step 210 of FIG. 15.

FIG. 20 shows a process in the step 214 of FIG. 15.

FIG. 27 shows a process in the step 408 of FIG. 26.

FIG. 28 shows a process in the step 409 of FIG. 26.

DETAILED DESCRIPTION OF THE PREFERRED EMBODIMENTS

As is well known, a robot comprises links connected with axes in series or in parallel. Each axis is driven by a motor, and has its own maximum allowable acceleration/deceleration value that is limited by the physical and the electrical characteristic of the motor or the motor control unit. A trajectory of a tip of the connected links is called hereafter a trajectory of a robot tip. A trajectory of a robot tip is instructed in accordance with a purpose of the robot. This trajectory is called an instructed trajectory. In the instructed trajectory, the maximum allowable acceleration/deceleration value is not considered for any axis, and therefore, there may be a point on the instructed trajectory which the robot tip cannot follow. This point is called a transit point.

For controlling the robot tip within the maximum allowable acceleration/deceleration values for each axis, the instructed trajectory and the velocity of the robot tip is modified. This modification is called acceleration/deceleration processing and the modified trajectory is called the trajectory after acceleration/deceleration processing.

In the following descriptions, a symbol headed by 'k' as k, km, kp, kn denotes a sampling time or an increment of sampling time on the instructed trajectory before acceleration/deceleration processing, for example, k represents k-th sampling time and kp means a time interval of kp times of a unit of time-sampling, while a symbol headed by 'j' as j, jm, jp, jn denotes a sampling time or an increment of sampling time on the trajectory after acceleration/deceleration processing. Symbols as $x_i$ or $x_i(y)$ mean i-th component of a vector value x or a vector function x(y), and a function $max(x_i)$ means the maximum value among components $x_i$ (i=1, 2, . . . , n) of an n-th vector x.

Figure 1:
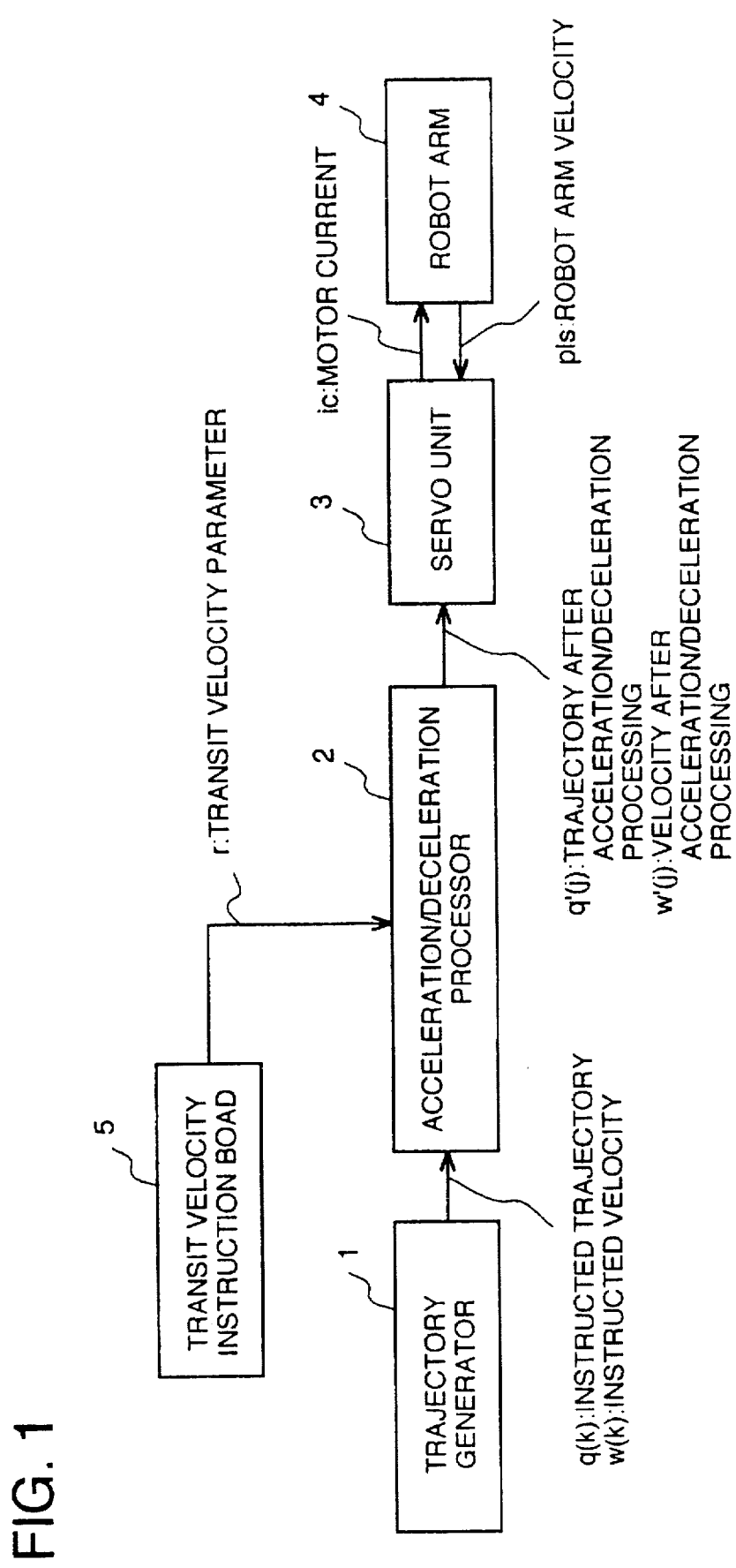
FIG. 1 shows a block diagram of an embodiment of the present invention.
Figure 2:
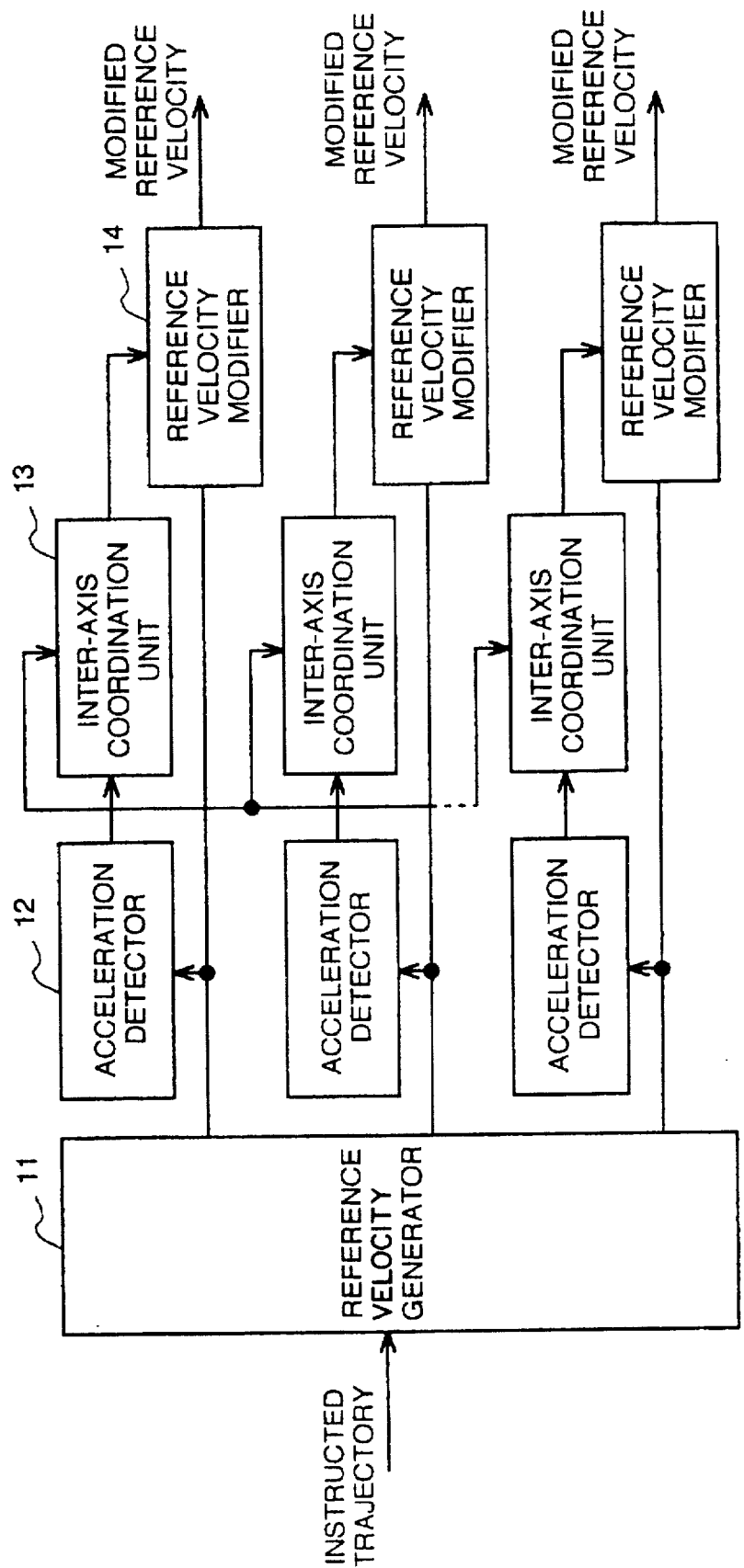
FIG. 2 shows a block diagram of a prior art of robot controls.
Figure 3:
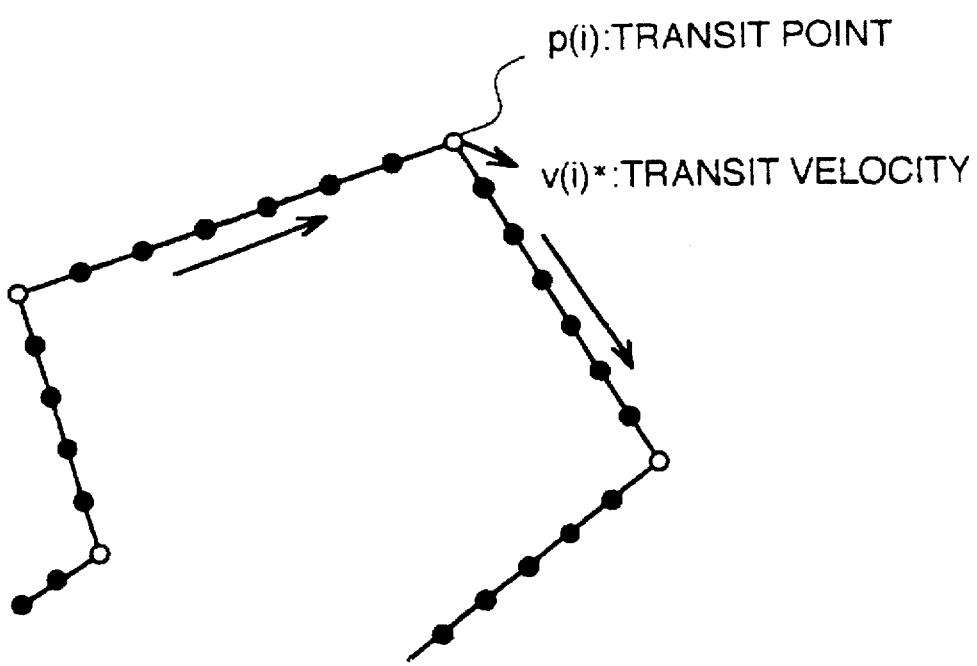
FIG. 3 shows a trajectory of a robot tip controlled by an apparatus of FIG. 2.
Figure 4:
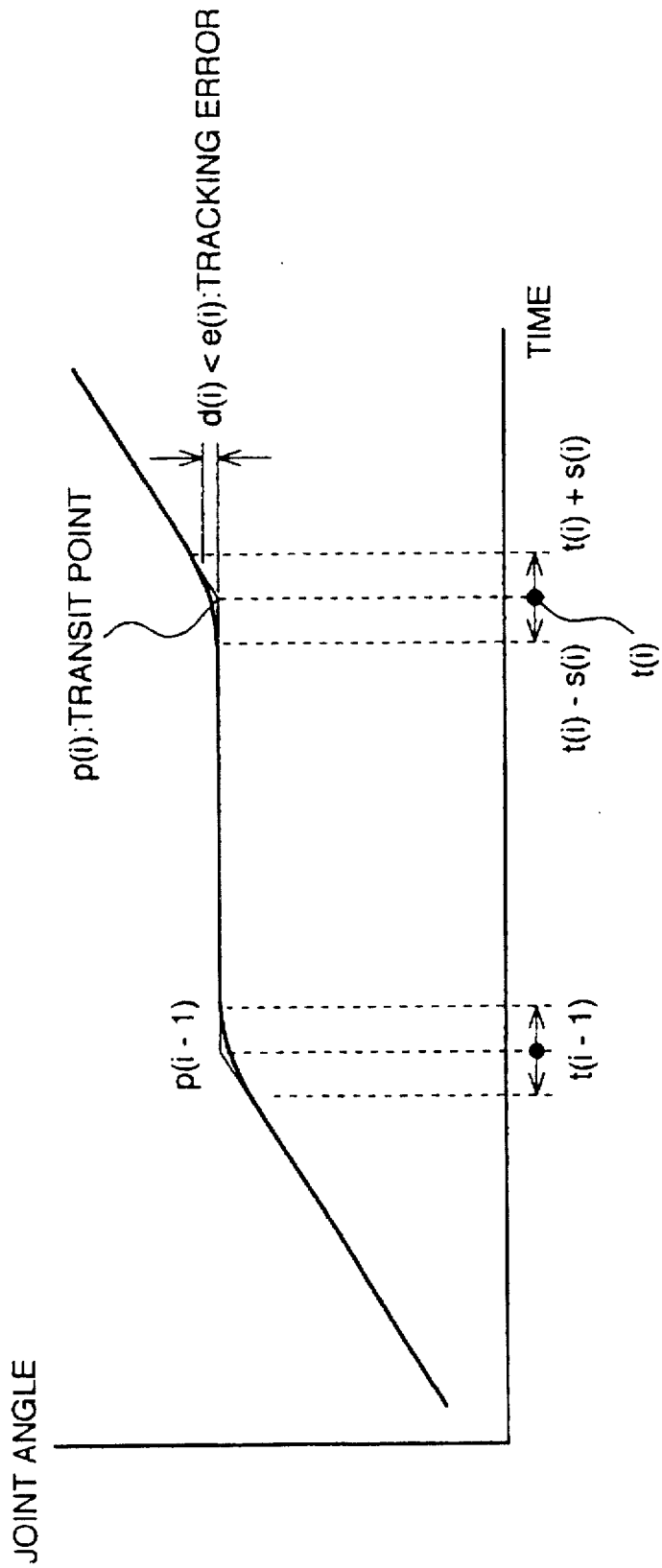
FIG. 4 shows a motion of a joint angle of a robot in another prior art of robot controls.
Figure 5:
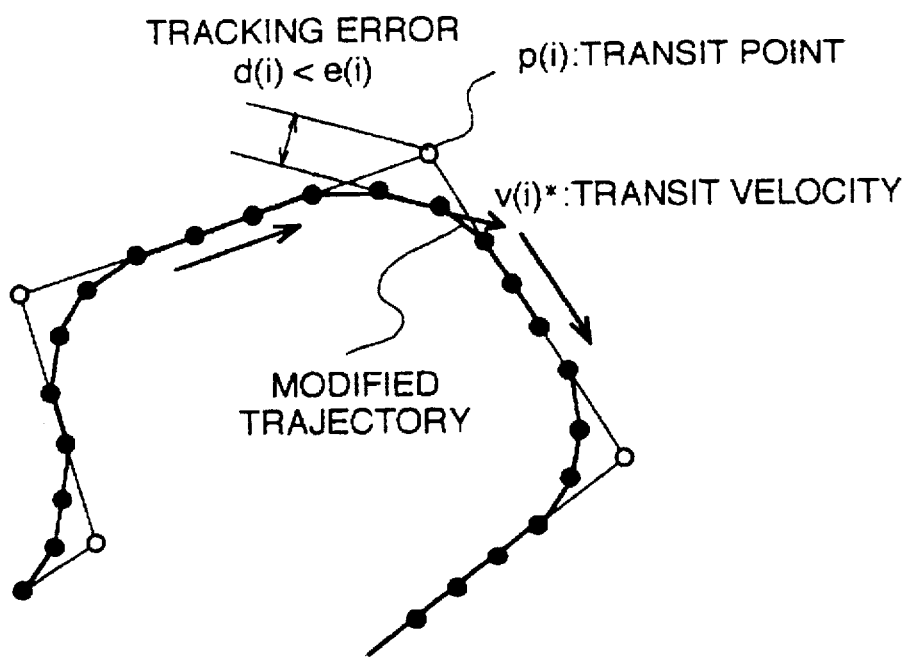
FIG. 5 shows a trajectory of a robot tip controlled in the prior art shown in FIG. 4.
Figure 6:
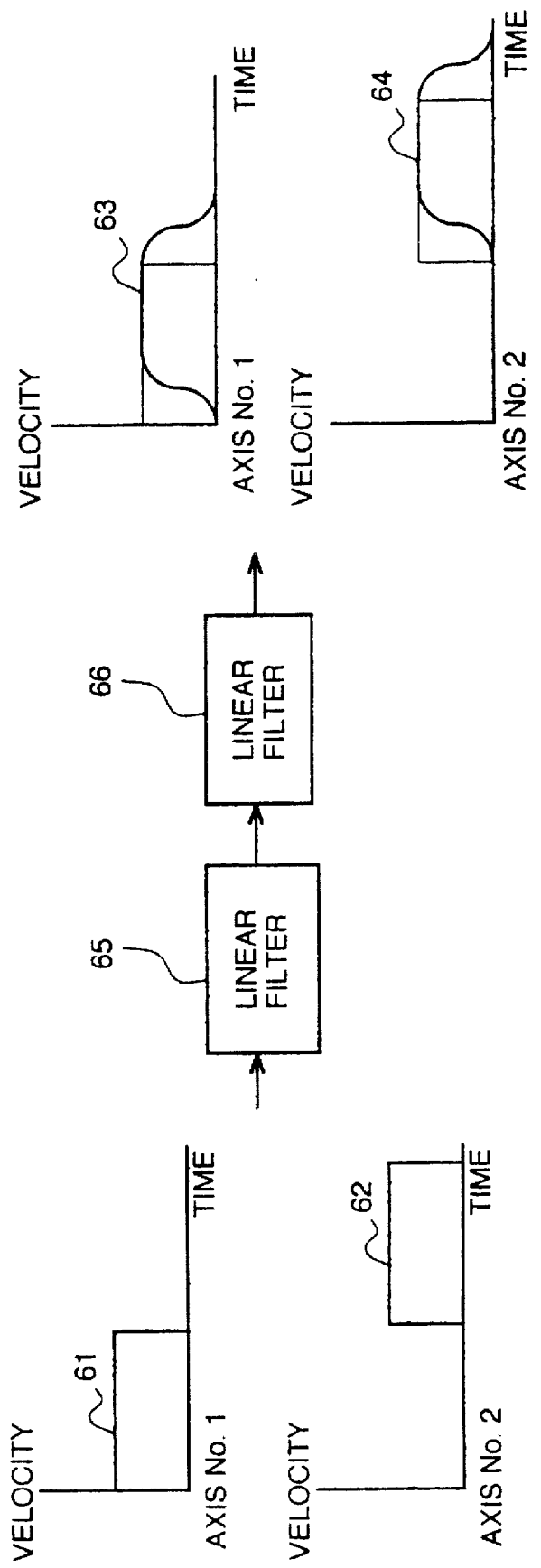
FIG. 6 shows acceleration/deceleration processing in still another prior art of robot controls.
Figure 7:
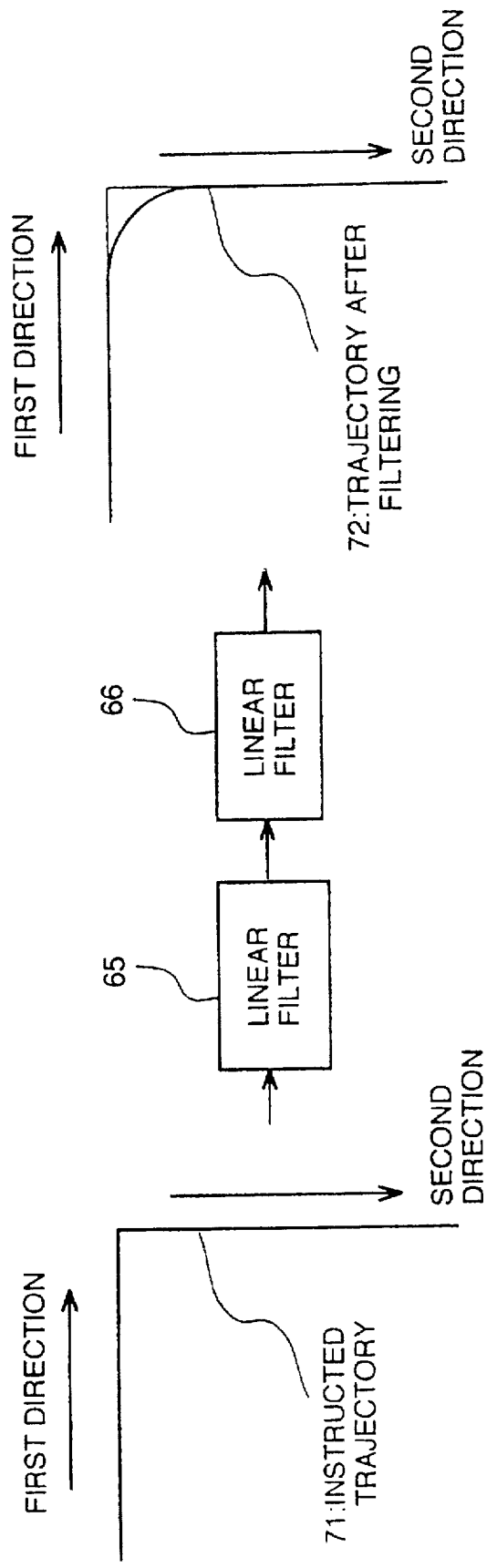
FIG. 7 shows a trajectory of a robot tip controlled in the prior art shown in FIG. 6.
Figure 8:
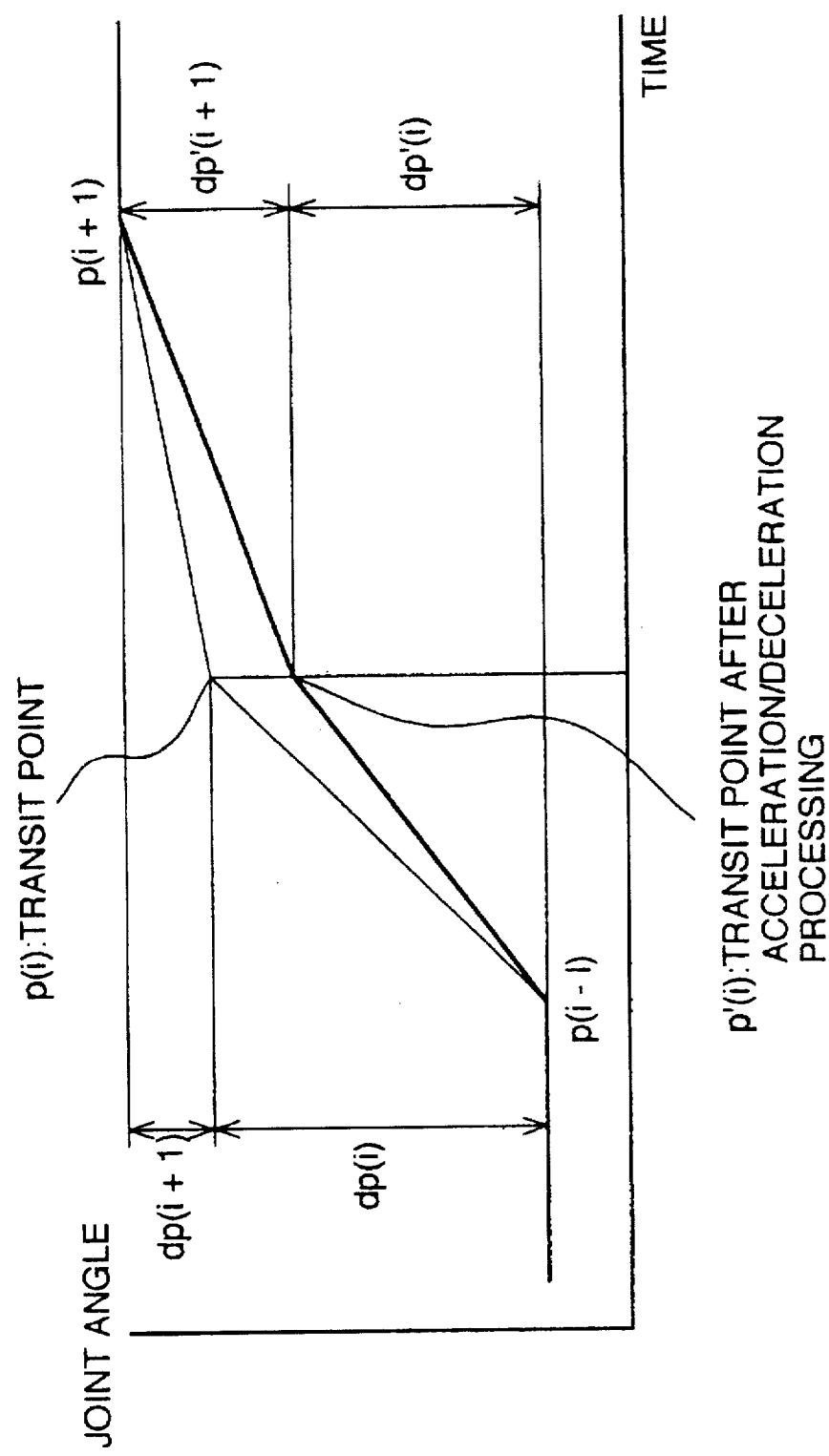
FIG. 8 shows motion of a joint angle of a robot in still another prior art of robot controls.

Referring now to FIG. 1, an instructed trajectory q(k) and a velocity w(k) of a robot tip is generated at a trajectory generator 1 from instructed points, CAD data, etc., where k represents a sampling time of the instructed trajectory. In the instructed trajectory q(k), a sampling point, where an axis of the robot is required to generate an acceleration/deceleration value beyond the allowable limit for the axis, is called a transit point q(km) before acceleration/deceleration processing.

An acceleration/deceleration processor 2 applies the acceleration/deceleration processing to q(k) and w(k) for producing a trajectory q'(j) and a velocity w'(j) after acceleration/deceleration processing, in order that no axis is required to generate the acceleration/deceleration value beyond the allowable limit for the axis. By this processing the transit point q(km) before acceleration/deceleration processing is modified to a corresponding transit point q'(jm) after acceleration/deceleration processing.

A value of the transit velocity parameter r is delivered from a transit velocity parameter instruction board 5. The acceleration/deceleration processor 2 uses the transit velocity parameter r for calculating a transit velocity after acceleration/deceleration processing. Then, the acceleration/deceleration processor 2 seeks a new trajectory wherein the calculated transit velocity is attained without requiring any acceleration/deceleration value out of limit. Thus, the trajectory q'(j) after acceleration/deceleration processing is obtained.

A servo unit 3 receives the trajectory q'(j) and the velocity w'(j) after acceleration/deceleration processing, and controls a robot arm 4 by generating reference values of motor currents for each axis referring to the robot arm velocity as a feed-back signal.

Figure 9:
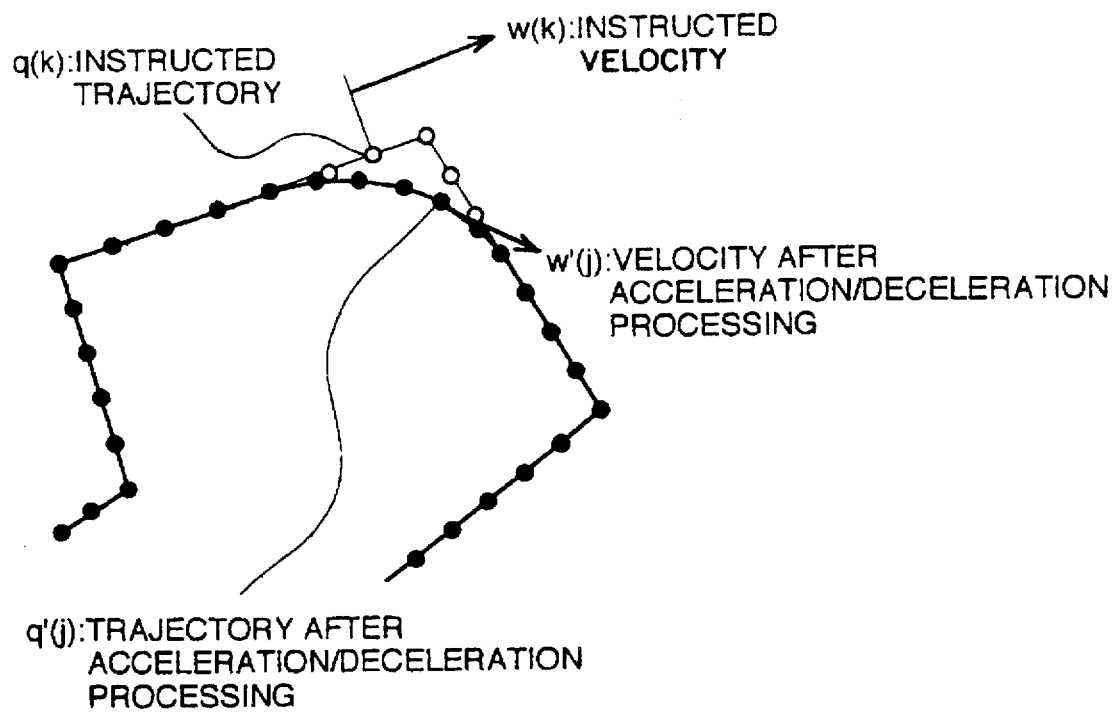
FIG. 9 shows trajectories before and after acceleration/deceleration processing in the embodiment of this invention shown in FIG. 1.

FIG. 9 shows an example of the instructed trajectory q(k) and the velocity w(k) before acceleration/deceleration processing generated at the trajectory generator 1, and the trajectory q'(j) and the velocity w'(j) after acceleration/deceleration processing modified by the acceleration/deceleration processor 2. In the instructed trajectory q(k), there is a transit point where at least an axis of the robot is required to generate an acceleration/deceleration value beyond the allowable limit for the axis. In the trajectory q'(j), such a transit point is eliminated.

Figure 10:
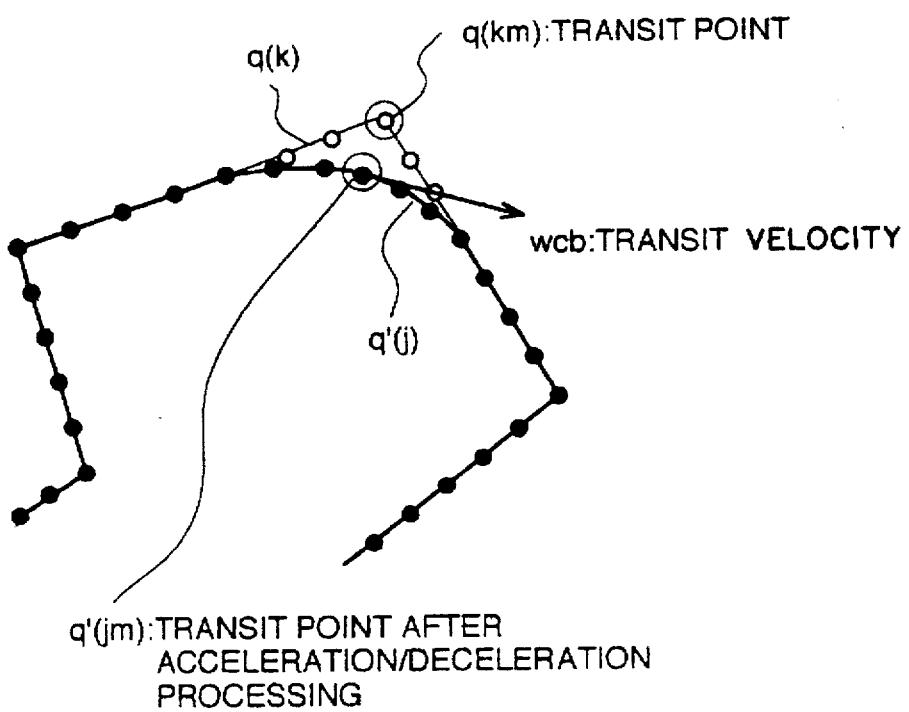
FIG. 10 shows a transit point q(km) before acceleration/deceleration processing, the transit point q'(jm) after acceleration/deceleration processing, and a transit velocity wcb after acceleration/deceleration processing in the embodiment shown in FIG. 1.

FIG. 10 shows an example of a transit point q(km) before acceleration/deceleration processing, and a transit velocity wcb calculated by the acceleration/deceleration processor 2. At the transit point q(km), at least an axis of the robot is required an acceleration/deceleration value beyond the allowable limit for the axis. When the instructed trajectory q(k) is transformed to the trajectory q'(j) in the acceleration/deceleration processor 2, the transit point q(km) before the acceleration/deceleration processing is replaced with the transit point q'(jm) after acceleration/deceleration processing. The acceleration/deceleration processor 2 calculates a transit velocity wcb, and obtains a trajectory q'(j) and a transit point q'(jm) after the acceleration/deceleration processing using the calculated velocity wcb.

FIG. 11 shows an example of the input and the output of the acceleration/deceleration processor 2. An instructed trajectory 111 is the input and a trajectory 112 after acceleration/deceleration processing is the output.

A sampling point q(km−kp), where acceleration/deceleration processing is commenced, is called a start point, and a sampling point q(km+kn), where acceleration/deceleration processing is finished, is called an end point. The start point q(km−kp) and the end point q(km+kp) are points which are not changed by acceleration/deceleration processing, and therefore, q'(jm−jp)=q(km−kp) and q'(jm+jn)=q(km+kn), where q'(jm−jp) and q'(jm+jn) are the start point and the end point on the trajectory q'(j) after acceleration/deceleration processing.

The average velocity from the start point q(km–kp) to the transit point q(km) is denoted by wp and an average velocity from the transit point q(km) to the end point q(km+kn) is denoted by wn. The transit velocity wcb after acceleration/deceleration processing is calculated from wp, wn and the transit velocity parameter r delivered from the transit velocity parameter instruction board 5.

Figure 12:
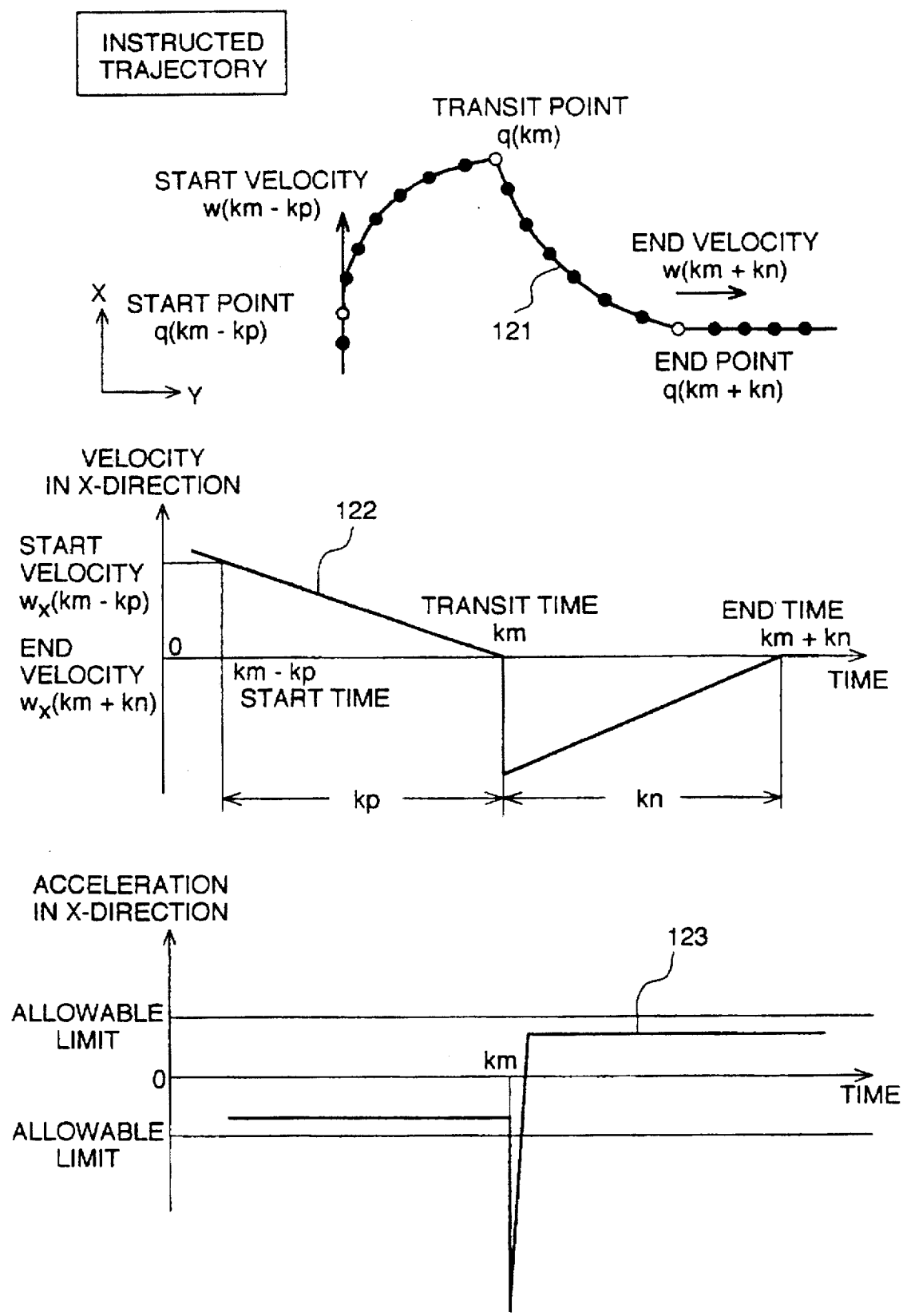
FIG. 12 shows the relation between an instructed trajectory of a robot tip, the corresponding velocity of an axis of the robot in an x direction, and the corresponding acceleration of the axis in the embodiment of FIG. 1.

FIG. 12 shows relations between the instructed trajectory 121, the velocity 122, and the acceleration 123 of a robot tip before acceleration/deceleration processing. The instructed trajectory q(k) is shown by 121 in FIG. 12 which is projected on an x-y plane, where small circles indicate sampling points, q(km–kp) being the start point of acceleration/deceleration processing, q(km) the transit point, and q(km+kn) the end point.

Since sampling points are equally spaced in time, an increment in the x direction between two adjacent small circles is an average velocity between adjacent two sampling points on the x axis. Thus, the velocity $w_x(k)$ on the x axis is plotted as 122 in FIG. 12 with an abscissa of time where kp is the time interval from the start point q(km–kp) to the transit point q(km), and kn is the time interval from the transit point q(km) to the end point q(km+kn). The acceleration/deceleration on the x axis is calculated as 123 in FIG. 12 as a time derivative of the velocity $w_x(k)$ on the x axis. At the sampling time km, the deceleration value goes out beyond the allowable limit indicated by two parallel lines in 123 of FIG. 12.

FIG. 13 shows the trajectory 131 projected on the x-y plane, the velocity 132 and the acceleration/deceleration 133 on the x axis after acceleration/deceleration processing corresponding to those shown in FIG. 12. In FIG. 13, q'(jm–jp) is the start point, q'(jm+jn) is the end point of acceleration/deceleration processing and q'(jm) is the transit point after acceleration/deceleration processing. The time intervals jp and jn are the first half and the latter half of the time interval required for acceleration/deceleration processing. In FIG. 13, the acceleration/deceleration on the x axis remains in the allowable limits as shown by 133. Heretofore, background knowledge on the present invention has been described.

Figure 14:
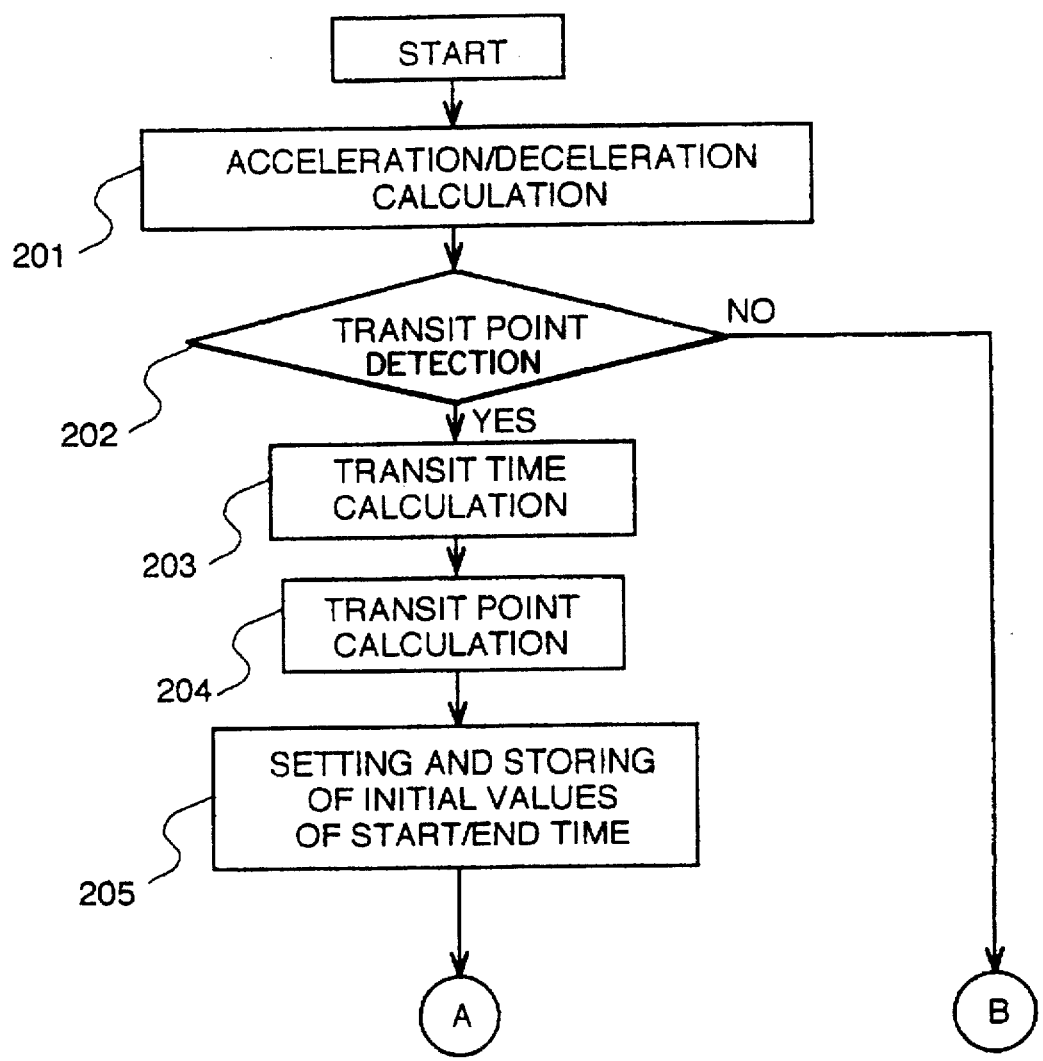
FIG. 14 is a flow chart illustrating the first part of 9 processes in an acceleration/deceleration processor shown in FIG. 1.
Figure 15:
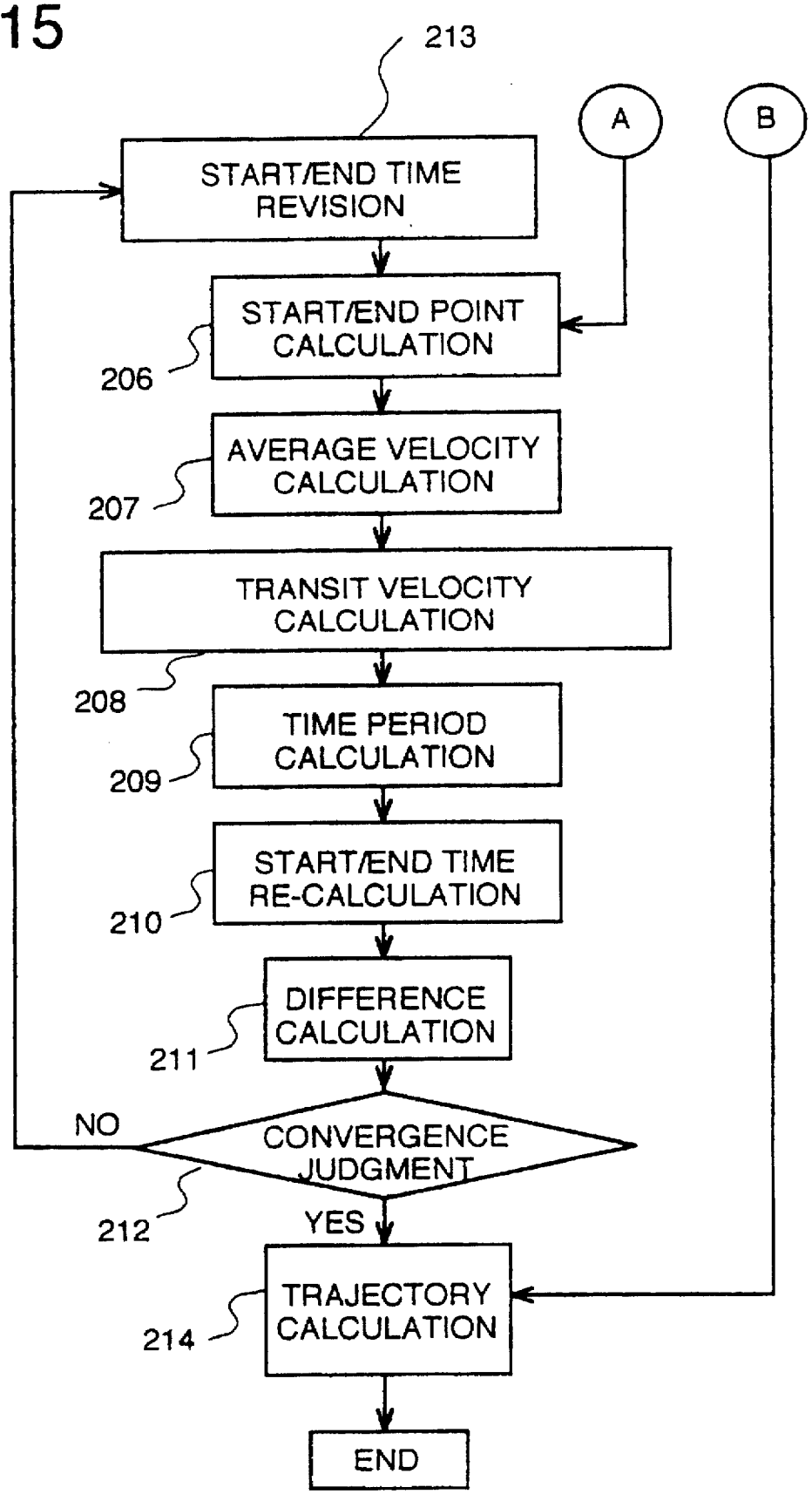
FIG. 15 is a flow chart illustrating the latter part of 9 processes in the acceleration/deceleration processor of FIG. 1.

Referring to FIG. 14 and FIG. 15, processing steps in the acceleration/deceleration processor 2 of an embodiment of the present invention is described in view of the background knowledge.

In step 201, acceleration/deceleration values required for each axis of the robot between every two adjacent sampling points of the instructed trajectory are calculated in order. When a sampling point where any axis of the robot is required to generate an acceleration/deceleration value beyond the allowable limit for the axis is found, the sampling point is considered as a transit point q(km) and acceleration/deceleration processing is performed. The judgment is performed at step 202 and the process goes to step 203. In the step 203 and step 204, the transit time km and the transit point q(km) are calculated and stored.

Next step 205 is the step for setting and storing in a register initial provisional values of the start time km–kp' and the end time km+kn' of acceleration/deceleration processing on the time scale of the instructed trajectory. Here, these initial provisional values may be set as kp'=kn'=1, for example. Then provisional values of the start point q(km–kp') and the end point q(km+kn') of acceleration/deceleration processing are calculated at step 206. In step 207, provisional values of the average velocity wp' from the provisional start point q(km+kn') to the transit point q(km)

and of the average velocity wn' from q(km) to the provisional end point q(km+kn') of acceleration/deceleration processing are calculated (refer to FIG. 11). In a step 208, the provisional value of the transit velocity wcb' (refer to FIG. 11) is calculated from wp', wn', and the transit velocity parameter r delivered from the transit velocity parameter instruction board 5.

Figure 16:
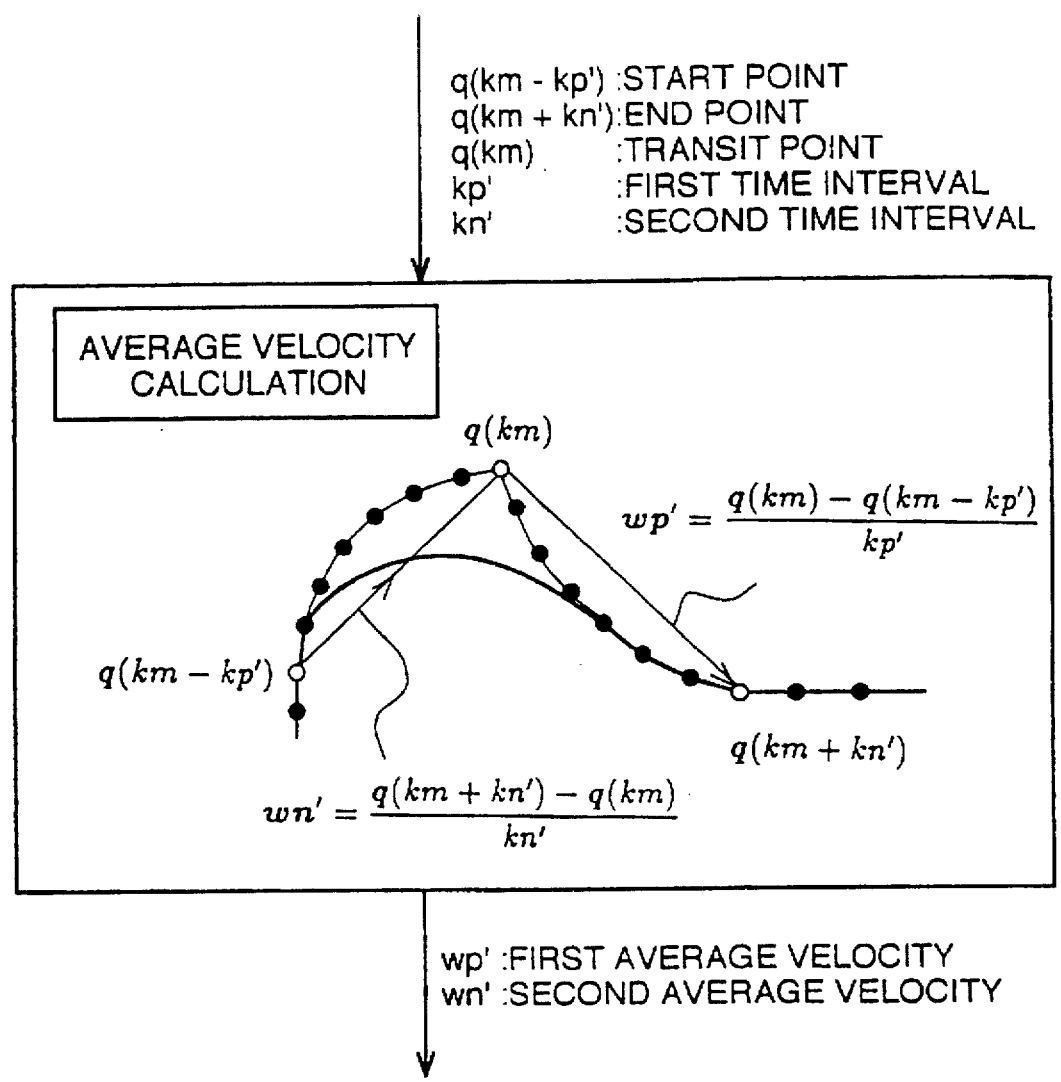
FIG. 16 shows a process in the step 207 of FIG. 15.

The process in the step 207 is shown in FIG. 16, where wp' and wn' are calculated by following equations.

$$wp' = (q(km) - q(km - kp'))/kp' \quad (1)$$

$$wn' = (q(km + kn') - q(km))/kn' \quad (2)$$

The process in the step 208 is shown in FIG. 17, where the provisional transit velocity wcb' is designated by an equation.

$$wcb' = (1-r)(wp' + wn')/2 \quad (3)$$

Returning to FIG. 15, in step 209, provisional values of time peroids jp' and jn' required for the first half and the latter half of acceleration/deceleration processing are calculated from wp', wcb', wn', and a vector of the maximum acceleration values allowable for each axis. FIG. 18 shows the process in the step 209. The provisional time peroids jp' and jn' are calculated by following equations.

$$jp' = max(|wcb'_i - w_i(km - kp')|/amax_i) \quad (4)$$

$$jn' = max(|w_i(km + kn') - wcb'_i|/amax_i) \quad (5)$$

where $amax_i$ is the i-th component of a vector amax, that is, the allowable limit of acceleration/deceleration for i-th axis of the robot.

In a step 210, revised values of the start time km–kp" and the end time km+kp" of the acceleration/deceleration processing on the time scale of the instructed trajectory is re-calculated by equations as shown in FIG. 19

$$km - kp'' = km - jp'/2 - (1-r)(jp' + jn')/4 \quad (6)$$

$$km + kn'' = km + jn'/2 + (1-r)(jp' + jn')/4 \quad (7)$$

In step 211, the values km–kp" and km+kn" calculated by the equations (6), (7) are compared to the corresponding values km–kp' and km+kn' stored in the register at the step 205 and the differences between them are calculated. In a step 212, the calculated differences are compared to a predetermined threshold value. When any one of the differences is larger than the threshold value, the process returns to the step 206 through step 213. In the step 213, the provisional values of km–kp' and km+kn' stored in the register are replaced with the revised values km–kp" and km+kn' calculated at the step 210, and the steps 206–212 are repeated.

When both of the differences calculated at the step 211 are found to be shorter than the threshold value, the process goes to step 214, where the trajectory after acceleration/deceleration processing is calculated as shown in FIG. 20, regarding the provisional values q(km–kp'), q(km+kn'), wcb', jp' and jn' as the start point q(km–kp), the end point q(km+kn) of acceleration/deceleration processing, the transit velocity wcb, and the time peroids jp and jn required for the first half and for the latter half of acceleration/deceleration processing.

Before the sampling time km–kp at the start point q(km–kp), the trajectory q'(j)=q(k) and the velocity w'(j)=w(k), without modification.

A character j in a range jm–jp<j<jm corresponds to sampling times in the first half of acceleration/deceleration processing on the time scale of the trajectory modified by the acceleration/deceleration processing, and in this range, and $ap=(wcb-w(km-kp))/jp$ represents the vector value of the acceleration/deceleration with which each axis is to be controled. With this ap, the velocity w'(j) and the trajectory q'(j) after the acceleration/deceleration processing is calculated step by step from their values at the sampling time of the start point $j-1=jm-jp=km-kp$ for a time period jp by following equations.

$$w'(j)=w'(j-1)+ap \qquad (8)$$

$$q'(j)=q'(j-1)+w'(j-1) \qquad (9)$$

In a range of j where $jm<j<(jm+jn)$, $an=(w(km+kn)-wcb))/jn$ represents the vector value of the acceleration/deceleration in the latter half of the acceleration/deceleration processing. Therefore, $$w'(j)=w'(j-1)+an \qquad (10)$$

$$q'(j)=q'(j-1)+w'(j-1) \qquad (11)$$

are calculated step by step from w'(jm) and q'(jm) obtained by equations (8) and (9).

Thus, the modified trajectory q'(j) and the modified velocity w'(j) are obtained to the end point of the acceleration/deceleration processing for a first found transit point. As for the remaining part of the instructed trajectory, the same processes can be repeated with the instructed trajectory, replacing the processed part thereof with the corresponding part of the modified trajectory. Selecting a value of the transit velocity parameter r, the velocity at a transit point can be specified quantitatively and continuously. For example, when $r=0$, $wcb=(wp+wn)/2$, and the robot tip is controlled in a favorable way for velocity continuity and when $r=1$, $wcb=0$, the robot tip is controlled for minimizing the tracking error, stopping at the transit point. The value of r between these two extremities is selected in consideration of tradeoff between the velocity continuity and the tracking error.

In FIG. 12, trajectories are shown by lines projected in an x-y orthogonal plain, but it is apparent that in the trajectory generator 1 and in the acceleration/deceleration processor 2, the embodiment can be applied to robot controls in any coordinates such as Cartesian coordinates or others, and therefore, coordinate transformations may be introduced between the trajectory generator 1 and the acceleration/deceleration processor 2, if necessary.

In the embodiment above described, a proportional value of the transit velocity wcb' is calculated as an average of wp' and wn' by the equation (3). The transit velocity can be determined, however, in other ways according to the object of the robot controls.

In another embodiment, wcb' is calculated as a linear combination of the wp' and wn' as following.

$$wcb'=(1-r)(rp\cdot wp'+rn\cdot wn') \qquad (12)$$

where, coefficients rp and rn are delivered from the transit parameter instruction board 5. In this embodiment, the equations (6), (7) are modified respectively to equations (13), (14).

$$km-kp''=km-jp'/2-(1-r)\cdot rp\cdot(jp'+jn')/2 \qquad (13)$$

$$km+kn''=km-jn'/2+(1-r)\cdot rn\cdot(jp'+jn')/2 \qquad (14)$$

In the equation (3), weight of influence on the transit velocity wcb' of the average velocity wp' and wn' before and after the transit point on the instructed trajectory are assumed to be identical, in the equation (12), the weight of influence is modified by values of coefficients rp, rn. When, for example, $rp=1$ and $rn=0$, the modified trajectory follows exactly the instructed trajectory before the transit point q(km) and the acceleration/deceleration processing is performed after the transit point q(km). Usually, the values of coefficients rp and rn are selected in a range $0 \leq rp$, $rn \leq 1/2$.

Figure 21:
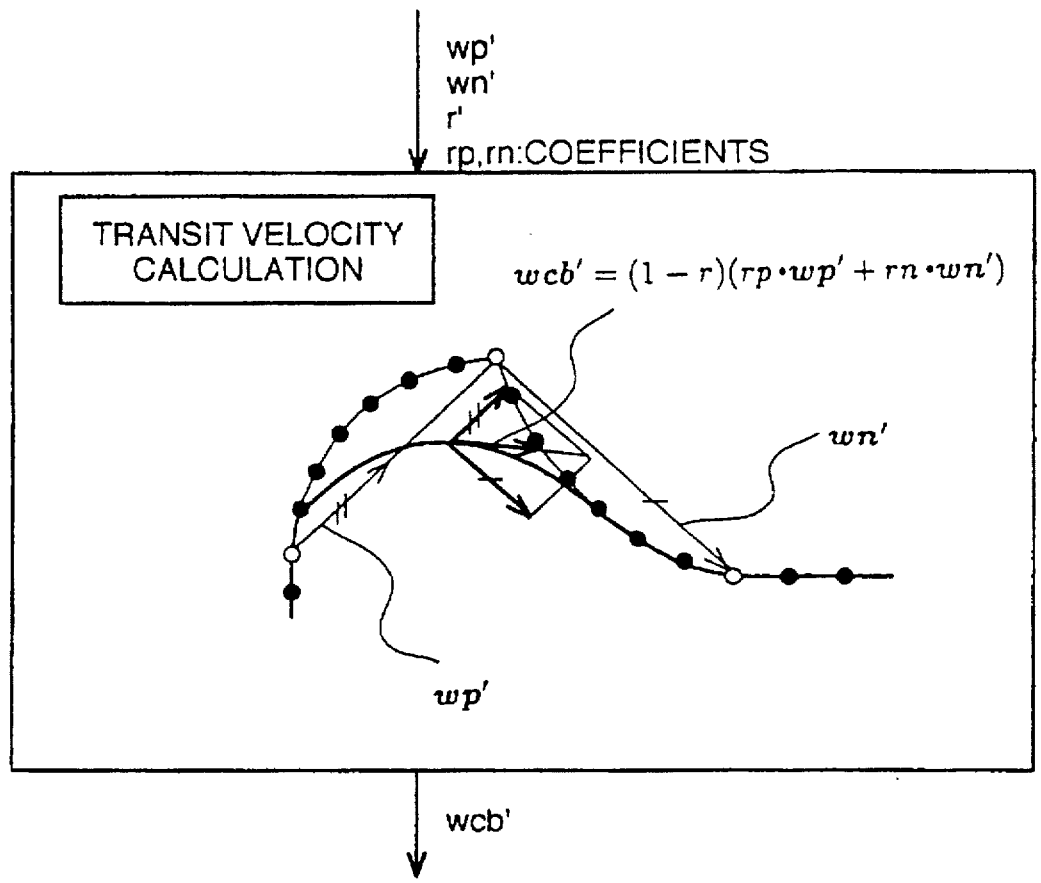
FIG. 21 shows another embodiment for calculating a transit velocity wcb after acceleration/deceleration processing.
Figure 22:
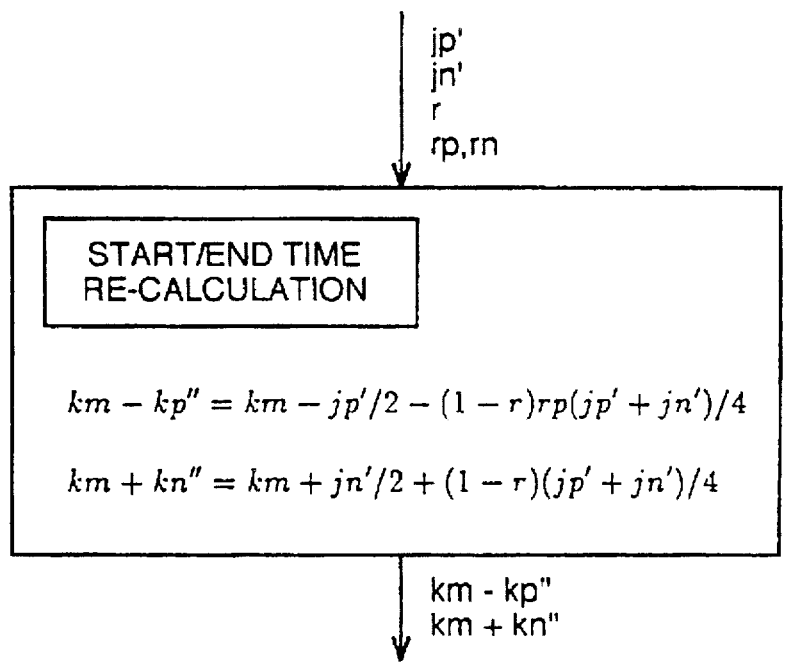
FIG. 22 shows a process of re-calculating the provisional start time km−kp" and the provisional end time km+kp" of acceleration/deceleration processing of the embodiment shown in FIG. 21.

The steps 208 and 210 of FIG. 15 in this embodiment are shown in FIG. 21 and FIG. 22 respectively.

Figure 23:
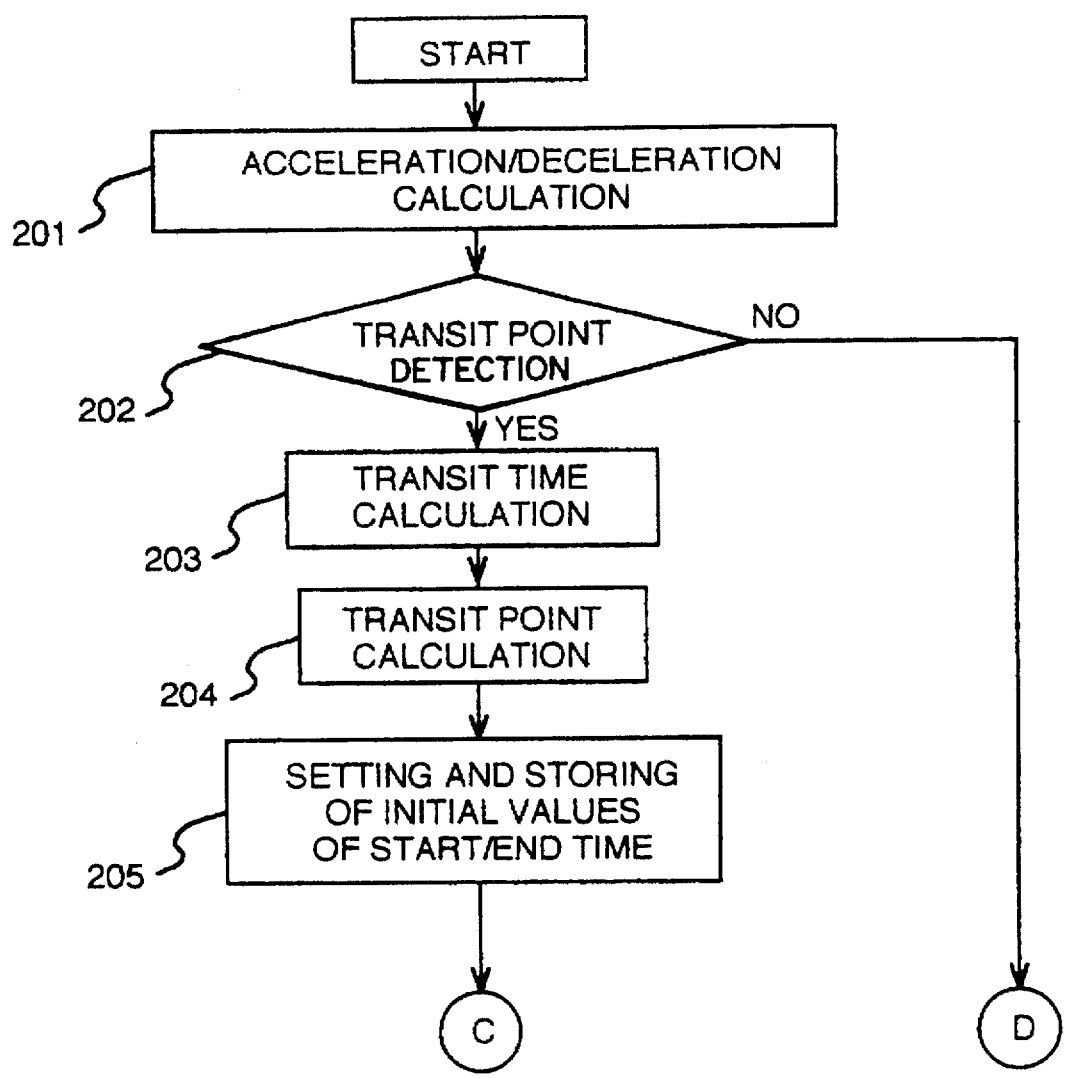
FIG. 23 is a flow chart illustrating the first part of processes in an acceleration/deceleration processor of still another embodiment of this invention.
Figure 24:
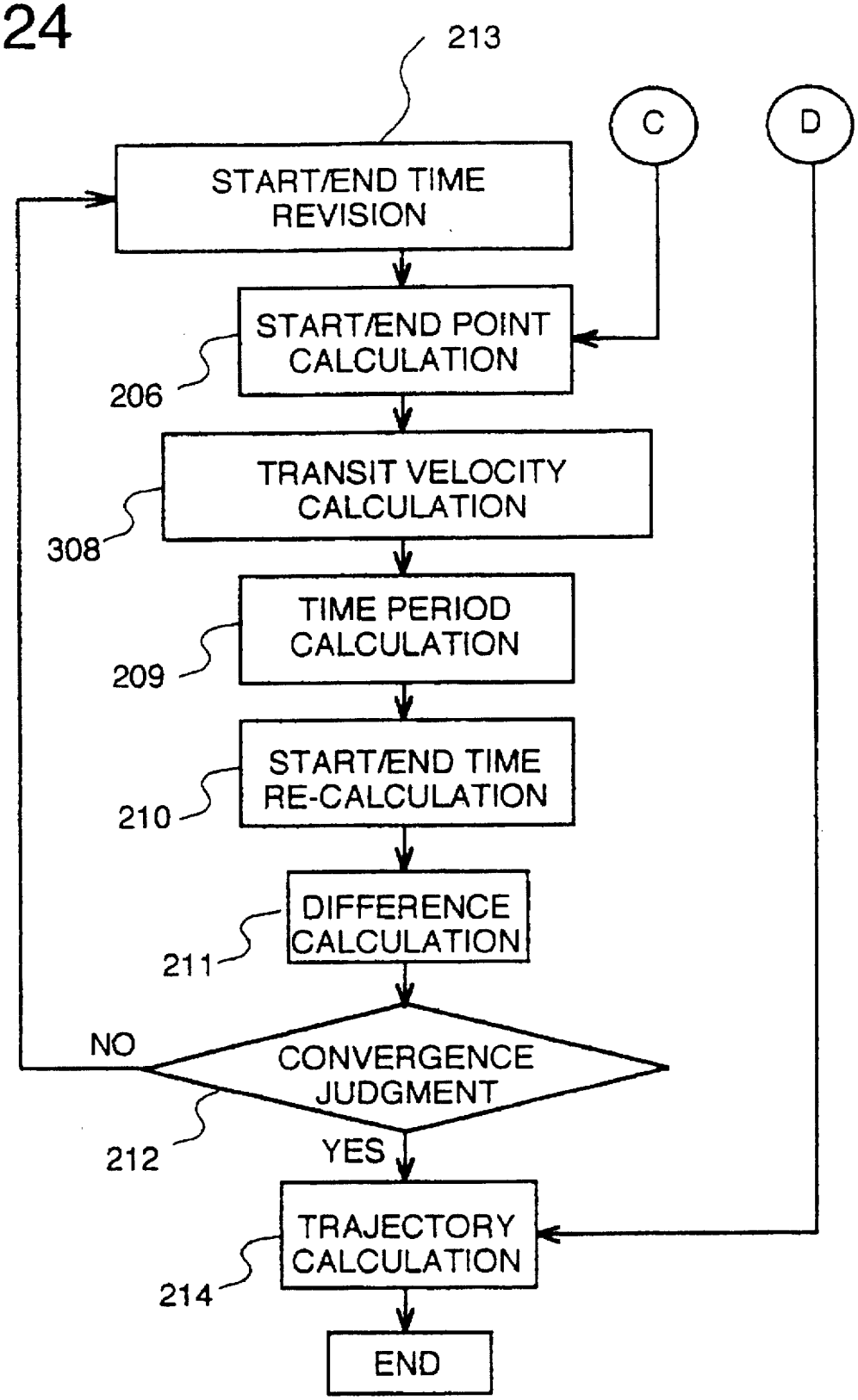
FIG. 24 is a flow chart illustrating the latter part of 9 processes in the acceleration/deceleration processor of the embodiment of FIG. 23.
Figure 25:
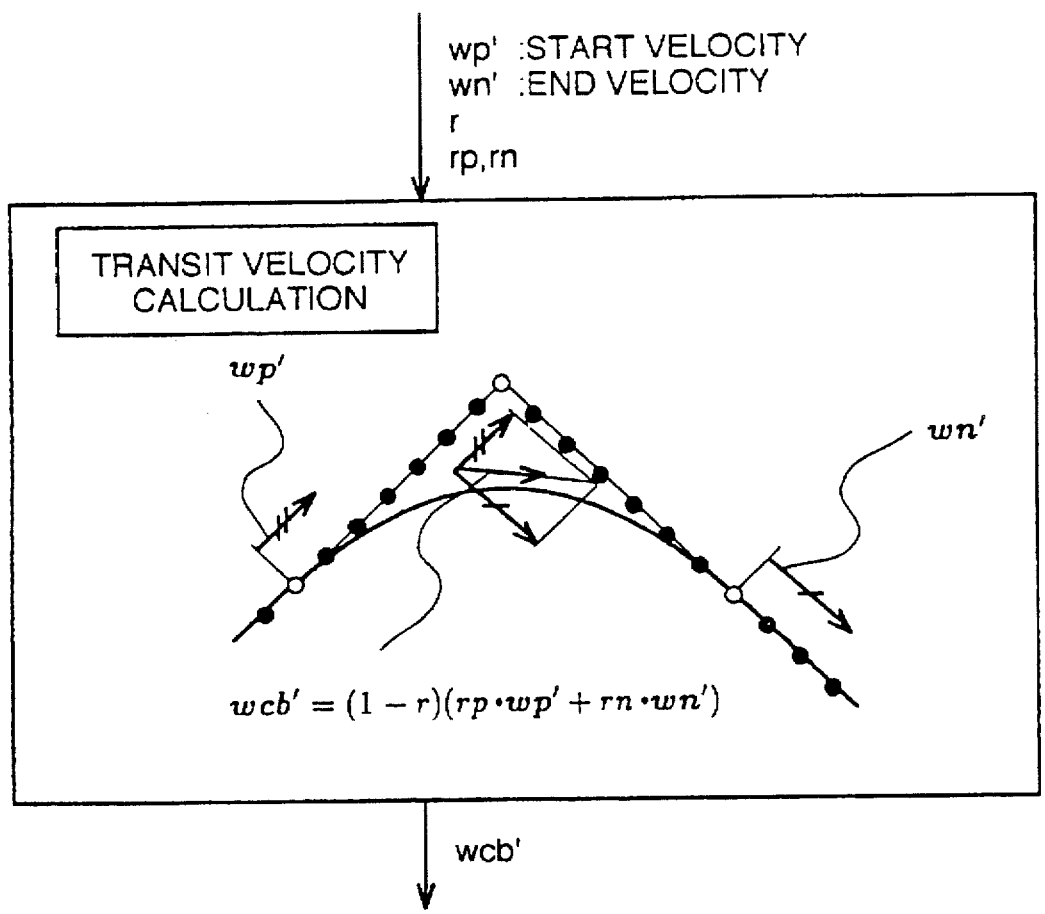
FIG. 25 shows a process in the step 308 of FIG. 24.

In still another embodiment of the invention, the acceleration/deceleration processor 2 performs acceleration/deceleration processing in accordance with flow charts of FIG. 23 and FIG. 24. The steps 201-206 and the steps 209-214 of FIG. 23 and FIG. 24 are the same with the corresponding steps of FIG. 14 and FIG. 15. A characteristic feature of FIG. 24 is in step 308 where the provisional transit velocity wcb' is calculated as a linear combination of the velocities w(km-kp') and w(km+kp') at the provisional start point and the provisional end point of the acceleration/deceleration processing. The step 308 is shown in FIG. 25 where an equation $$wcb'=(1-r)(rp\cdot w(km-kp')+rn\cdot w(kp+kn')) \qquad (15)$$

is used for determining wcb'.

In this embodiment, the step 207 in the FIG. 15 is eliminated and applicable to robot controls for instructed trajectories in which both of the velocities before and after a transit point do not vary so much.

In still another embodiment of this invention, the transit velocity wcb is determined as a linear combination of the velocity wp'' and wn'', which are the velocities of the robot tip just before and just after the transit point q(km) on the instructed trajectory.

Figure 26:
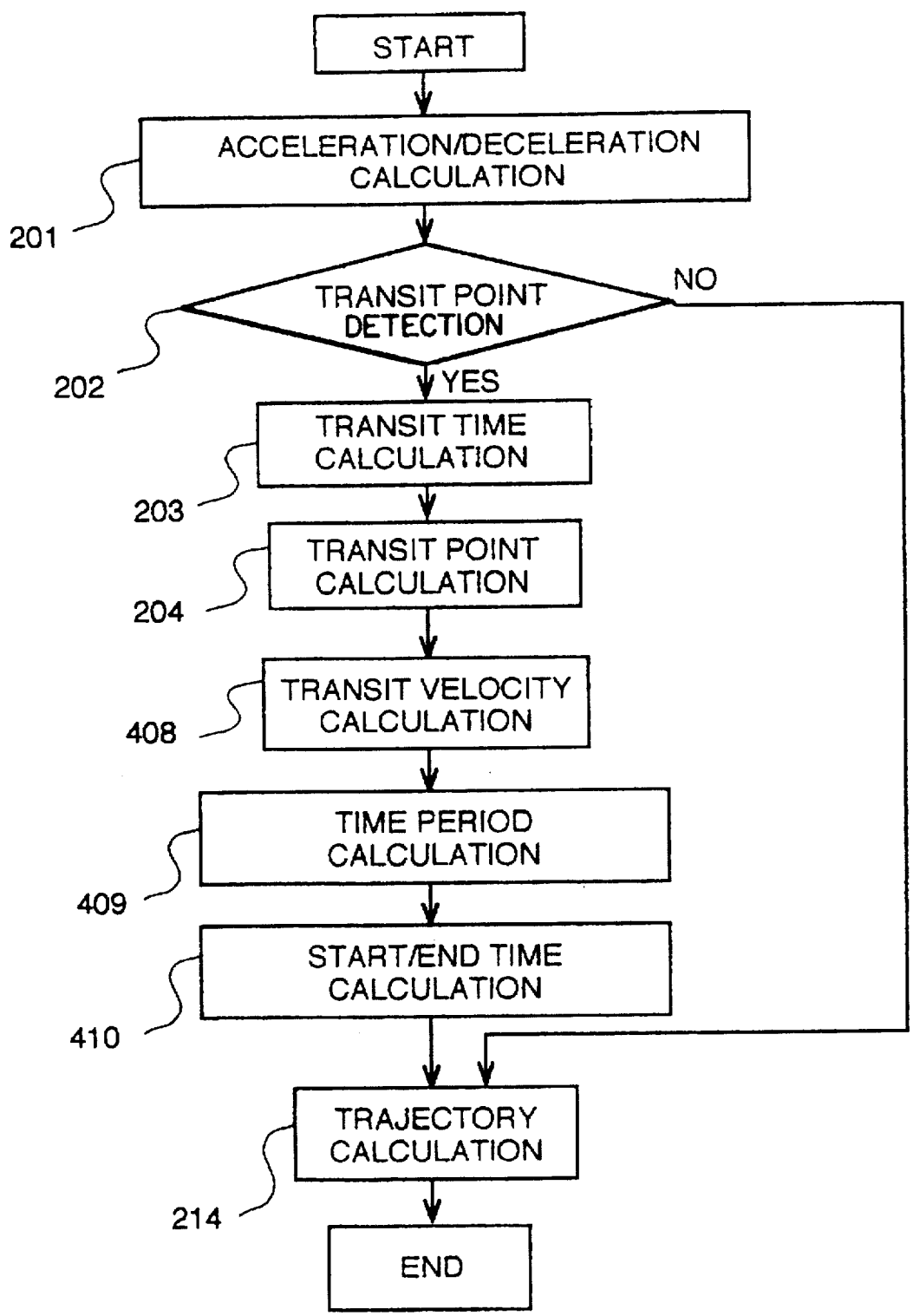
FIG. 26 is a flow chart illustrating processes in an acceleration/deceleration processor of still another embodiment of this invention.

The acceleration/deceleration processor 2 processes the instructed trajectory in accordance with a flow chart of FIG. 26.

Similarly as in FIG. 14, in the step 201, acceleration/deceleration values of the instructed trajectory required for each axis of the robot are calculated in order. When a transit point is found, the process goes to step 203. In the step 203 and step 204, the transit time km and the transit point q(km) is calculated.

In step 408, the transit velocity wcb is calculated by following equation as shown in FIG. 27 with the transit velocity parameter r and coefficients rp and rn delivered from the transit parameter instruction board 5, so that:

$$wcb=(1-r)(rp\cdot wp''+rn\cdot wn'') \qquad (16)$$

Then in step 409 of FIG. 26, the time periods jp and jn required for the first half and the latter half of acceleration/deceleration processing are calculated by following equations as shown in FIG. 28.

$$jp=max(|wcb_i-wp''_i|/Vamax_i) \qquad (17)$$

$$jn=max(|wn''_i-wcb_i|/Vamax_i) \qquad (18)$$

In this embodiment, the start time km-kp and the end time km+kn of acceleration/deceleration processing on the time scale of the instructed trajectory are determined directly by the following equations in step 410.

$$km-kp=km-jp/2-(1-r)\cdot rp\cdot(jp+jn)/2 \qquad (19)$$

$$km+kn=km+jn/2+(1-r)\cdot rn\cdot(jp+jn)/2 \qquad (20)$$

Then, the trajectory q'(j) and the velocity w'(j) after acceleration/deceleration processing are calculated at the step 214 in the same manner as in the embodiment shown in FIG. 15 and FIG. 20.

This embodiment is applied in robot controls for instructed trajectories wherein both of the velocities before and after a transit point vary little from trajectories composed of straight line segments, and the repeating calculation of kp' and kn' in FIG. 15 or in FIG. 24 is eliminated.

Returning to FIG. 1, the trajectory q'(j) and the velocity w'(j) are delivered to the servo unit 3. Each axis of the robot arm 4 is feedback-controlled according with the corresponding component of the velocity w'(j) as the reference value, and the tip of the robot arm 4 follows the trajectory q'(j) generated at the acceleration/deceleration processor 2.

A user can preset appropriate values of the transit velocity parameter r and the coefficients rp and rn for each transit point, globally or separately, through the transit velocity parameter instruction board 5 to specify the transit velocity wcb in consideration of tradeoff between the velocity continuity and the tracking error at the transit points.

What is claimed is:

1. A method of controlling a robot comprising:

a step of detecting a transit time km of an instructed trajectory generated as a first vector function of time, said transit time km being a sampling time of said instructed trajectory when an axis of the robot being required to produce an acceleration/deceleration value beyond an allowable limit for said axis;

a step of calculating a transit point by said first vector function from said transit time km;

a step of setting an initial start time km−kp' before said transit time km and an initial end time km+kn' after said transit time km;

a step of storing said initial start time km−kp' and said initial end time km+kn' in a register as a provisional start time km−kp' and a provisional end time km+kn' respectively;

a step of revising said provisional start time km−kp' and said provisional end time km+kn', including steps of, calculating a provisional start point and a provisional end point by said first vector function from said provisional start time km−kp' and said provisional end time km+kn' respectively, calculating a provisional start velocity w(km−kp') and a provisional end velocity w(km+kn') of the robot tip using said first vector function from said provisional start time km−kp' and said provisional end time km+kn' respectively, calculating a first provisional average velocity wp' of the robot tip between said provisional start point and said transit point and a second provisional average velocity wn' of the robot tip between said transit point and said provisional end point, from said provisional start point, said provisional start time km−kp', said transit point, said transit time km, said provisional end point and said provisional end time km+kn', calculating a provisional transit velocity wcb' as a linear combination of said first provisional average velocity wp' and said second provisional average velocity wn' referring to a transit velocity parameter r and coefficients rp and rn specified by a user, according to an equation $$wcb' = (1-r)(rp \cdot wp' + rn \cdot wn')$$

calculating a first provisional time period jp' necessary for accelerating/decelerating the robot tip from said provisional start velocity w(km−kp') to said provisional transit velocity wcb' and a second provisional time period jn' necessary for accelerating/decelerating the robot tip from said provisional transit velocity wcb' to said provisional end velocity w(km+kn'), requiring no axis of the robot to produce an acceleration/deceleration value beyond an allowable limit for said axis, by equations $$jp' = max(|wcb'_i - w_i(km-kp')|/amax_i)$$ and $$jn' = max(|w_i(km+kn') - wcb'_i|/amax_i),$$

where $wcb'_i$, $w_i(km-kp')$ and $w_i(km+kn')$ represent i-th component of said provisional transit velocity wcb', said provisional start velocity w(km−kp') and said provisional end velocity w(km+kn') respectively, $amax_i$ representing a maximum value of i-th component of acceleration of the robot tip allowable for corresponding i-th axis of the robot and $max(x_i)$ being a function to give a maximum value among components $x_i$ (i=1, 2, ..., n) of a vector x, calculating a revised start time km−kp" and a revised end time km+kn" from said transit time km, said first provisional time period jp', said second provisional time period jn', said transit velocity parameter r and said coefficients rp and rn by equations $$km-kp" = km-jp'/2-(1-r) \cdot rp \cdot (rp \cdot jp' + rn \cdot jn')/2$$

and $$km+kn" = km+jn'/2+(1-r) \cdot rn \cdot (rp \cdot jp' + rn \cdot jn')/2,$$

calculating differences between said revised start time km−kp" and said provisional start time km−kp' stored in said register and between said revised end time km+kn" and said provisional end time km+kn' stored in said register, and rewriting values of said provisional start time km−kp' and said provisional end time km+kn' in said register with values of said revised start time km−kp" and said revised end time km+kn" respectively when any one of said differences is not smaller than a predetermined threshold value;

a step of repeating said step of revising until both of said defferences become samller than said predetermined thresholed value;

a step of outputting said provisional start time km−kp', said provisional end time km+kn', said provisional start velocity w(km−kp'), said provisional end velocity w(km+kn'), said first provisional time period jp', said second provisional time period jn' and said provisional transit velocity wcb' as a start time km−kp, an end time km+kn, a start velocity w(km−kp), an end velocity w(km+kn), a first time period jp, a second time period jn and a transit velocity wcb when both of said differences become smaller than said predetermined threshold value;

a step of calculating a first acceleration/deceleration value ap and a second acceleration/deceleration value an from said start velocity w(km−kp), said end velocity w(km+kn), said transit velocity wcb, said first time interval jp and said second time interval jn by equations $$ap = (wcb - w(km-kp))/jp$$ and $$an = (w(km+kn) - wcb)/jn;$$ and a step of generating a trajectory after acceleration/deceleration processing as a second vector function of time to accelerate/decelerate the robot tip from said start time km–kp with said first acceleration/deceleration value ap for said first time period jp and with said second acceleration/deceleration value an for said second time period jn succeeding said first time period jp.

2. A method of controlling a robot comprising:
   a step of detecting a transit time km of an instructed trajectory generated as a first vector function of time, said transit time km being a sampling time of said instructed trajectory when an axis of the robot being required to produce an acceleration/deceleration value beyond an allowable limit for said axis;
   a step of calculating a transit point by said first vector function from said transit time km;
   a step of setting an initial start time km–kp' before said transit time km and an initial end time km+kn' after said transit time km;
   a step of storing said initial start time km–kp' and said initial end time km+kn' in a register as a provisional start time km–kp' and a provisional end time km+kn' respectively;
   a step of revising said provisional start time km–kp' and said provisional end time km+kn', including steps of,
      calculating a provisional start point and a provisional end point by said first vector function from said provisional start time km–kp' and said provisional end time km+kn' respectively,
      calculating a provisional start velocity w(km–kp') and a provisional end velocity w(km+kn') of the robot tip using said first vector function from said provisional start time km–kp' and said provisional end time km+kn' respectively,
      calculating a provisional transit velocity wcb' as a linear combination of said provisional start velocity w(km–kp') and said provisional end velocity w(km+kn')' referring to a transit velocity parameter r and coefficients rp and rn specified by a user, according to an equation $$wcb'=(1-r)(rp\cdot w(km-kp')+rn\cdot w(kp+kn')),$$

calculating a first provisional time period jp' necessary for accelerating/decelerating the robot tip from said provisional start velocity w(km–kp') to said provisional transit velocity wcb' and a second provisional time period jn' necessary for accelerating/decelerating the robot tip from said provisional transit velocity wcb' to said provisional end velocity w(km+kn'), requiring no axis of the robot to produce an acceleration/deceleration value beyond an allowable limit for said axis, by equations $$jp'=max(|wcb'_i-w_i(km-kp')|/amax_i) \text{ and}$$

$$jn'=max(|w_i(km+kn')-wcb'_i|/amax_i),$$

where $wcb'_i$, $w_i(km-kp')$ and $w_i(km+kn')$ represent i-th component of said provisional transit velocity wcb', said provisional start velocity w(km–kp') and said provisional end velocity w(km+kn') respectively, $amax_i$ representing a maximum value of i-th component of acceleration of the robot tip allowable for corresponding i-th axis of the robot and $max(x_i)$ being a function to give a maximum value among components $x_i$ (i=1, 2, . . . , n) of a vector x,
      calculating a revised start time km–kp" and a revised end time km+kn" from said transit time km, said first provisional time period jp', said second provisional time period jn', said transit velocity parameter r and said coefficients rp and rn by equations $$km-kp''=km-jp'/2-(1-r)\cdot rp\cdot(rp\cdot jp'+rn\cdot jn')/2$$

and $$km+kn''=km+jn'/2+(1-r)\cdot rn\cdot(rp\cdot jp'+rn\cdot jn')/2,$$

calculating differences between said revised start time km–kp" and said provisional start time km–kp' stored in said register and between said revised end time km+kn" and said provisional end time km+kn' stored in said register, and
         rewriting values of said provisional start time km–kp' and said provisional end time km+kn' in said register with values of said revised start time km–kp" and said revised end time km+kn" respectively when any one of said differences is not smaller than a predetermind threshold value;
   a step of repeating said step of revising until both of said defferences become samller than said predetermined thresholed value;
   a step of outputting said provisional start time km–kp', said provisional end time km+kn', said provisional start velocity w(km–kp'), said provisional end velocity w(km+kn'), said first provisional time period jp', said second provisional time period jn' and said provisional transit velocity wcb' as a start time km–kp, an end time km+kn, a start velocity w(km–kp), an end velocity w(km+kn), a first time period jp, a second time period jn and a transit velocity wcb when both of said differences become smaller than said predetermined threshold value;
   a step of calculating a first acceleration/deceleration value ap and a second acceleration/deceleration value an from said start velocity w(km–kp), said end velocity w(km+kn), said transit velocity wcb, said first time interval jp and said second time interval jn by equations $$ap=(wcb-w(km-kp))/jp \text{ and}$$

$$an=(w(km+kn)-wcb)/jn; \text{ and}$$

a step of generating a trajectory after acceleration/deceleration processing as a second vector function of time to accelerate/decelerate the robot tip from said start time km–kp with said first acceleration/deceleration value ap for said first time period jp and with said second acceleration/deceleration value an for said second time period jn succeeding said first time period jp.

3. A method of controlling a robot comprising:
   a step of detecting a transit time km of an instructed trajectory generated as a first vector function of time, said transit time km being a sampling time of said instructed trajectory when an axis of the robot being required to produce an acceleration/deceleration value beyond an allowable limit for said axis;
   a step of calculating a transit point by said first vector function from said transit time km;
   a step of calculating a provisional transit velocity wcb as a linear combination of a first velocity wp" of the robot tip just before said transit point and a second velocity wn" of the robot tip just after said transit point referring to a transit velocity parameter r and coefficients rp and rn specified by a user, according to an equation $$wcb=(1-r)(rp\cdot wp''+rn\cdot wn'');$$

a step of calculating a first time period jp necessary for accelerating/decelerating the robot tip from said first velocity wp" to said transit velocity wcb and a second time period jn necessary for accelerating/decelerating the robot tip from said transit velocity wcb to said second velocity wn", reqiring no axis of the robot to produce an acceleration/deceleration value beyond an allowable limit for said axis, by equations $$jp = max(|wcb_i - wp''_i|/amax_i) \text{ and}$$

$$jn = max(|wn''_i - wcb_i|/amax_i),$$

where $wcb_i$, $wp_i$ and $wn_i$ represent i-th component of said transit velocity wcb, said first velocity wp" and said second velocity wn" respectively, $amax_i$ representing a maximum value of i-th component of acceleration of the robot tip allowable for corresponding i-th axis of the robot and $max(x_i)$ being a function to give a maximum value among components $x_i$ (i=1, 2, ..., n) of a vector x;

a step of calculating a start time km−kp and an end time km+kn from said transit time km, said first time period jp, said second time period jn, said transit velocity parameter r and said coefficients rp and rn by equations $$km-kp = km - jp/2 - (1-r) \cdot rp \cdot (rp \cdot jp + rn \cdot jn)/2 \text{ and}$$

$$km+kn = km + jn/2 + (1-r) \cdot rn \cdot (rp \cdot jp + rn \cdot jn)/2;$$

a step of calculating a start velocity w(km−kp) and an end velocity w(km+kn) using said first vector function from said start time km−kp and said end time km+kn respectively;

step of calculating a first acceleration/deceleration value ap and a second acceleration/deceleration value an from said start velocity w(km−kp), said end velocity w(km+kn), said transit velocity wcb, said first time interval jp and said second time interval jn by equations $$ap = (wcb - w(km-kp))/jp \text{ and}$$

$$an = (w(km+kn) - wcb)/jn; \text{ and}$$

a step of generating a trajectory after acceleration/deceleration processing as a second vector function of time to accelerate/decelerate the robot tip from said start time km−kp with said first acceleration/deceleration value ap for said first time period jp and with said second acceleration/deceleration value an for said second time period jn succeeding said first time period jp.

4. An apparatus for controlling a robot having a trajectory generator for generating an instructed trajectory of a robot tip as a first vector function of time, an acceleration/deceleration processor for processing said instructed trajectory to generate a trajectory after acceleration/deceleration processing as a second vector function of time wherein no axis of the robot is required to produce an acceleration/deceleration value beyond an allowable limit for said axis, a transit velocity parameter instruction board for specifying a transit velocity parameter r and coefficients rp and rn referred to by said acceleration/deceleration processor, and a servo unit for feedback-controlling the robot in accordance with said trajectory after acceleration/deceleration processing; said acceleration/deceleration processor comprising:

means for detecting a transit time km of said instructed trajectory when an axis of the robot being required to produce an acceleration/deceleration value beyond an allowable limit for said axis;

means for calculating a transit point by said first vector function from said transit time km;

means for setting an initial start time km−kp' before said transit time km and an initial end time km+kn' after said transit time km;

means for storing said initial start time km−kp' and said initial end time km+kn' in a register as a provisional start time km−kp' and a provisional end time km−kp' respectively;

means for revising said provisional start time km−kp' and said provisional end time km+kn', including, means for calculating a provisional start point and a provisional end point by said first vector function from said provisional start time km+kp' and said provisional end time km+kn' respectively, means for calculating a provisional start velocity w(km−kp') and a provisional end velocity w(km+kn') of the robot tip using said first vector function from said provisional start time km−kp' and said provisional end time km+kn' respectively, means for calculating a first provisional average velocity wp' of the robot tip between said provisional start point and said transit point and a second provisional average velocity wn' of the robot tip between said transit point and said provisional end point, from said provisional start point, said provisional start time km−kp', said transit point, said transit time km, said provisional end point and said provisional end time km−kn', means for calculating a provisional transit velocity wcb' as a linear combination of said first provisional average velocity wp' and said second provisional average velocity wn' referring to said transit velocity parameter r and said coefficients rp and rn, according to an equation $$wcb' = (1-r)(rp \cdot wp' + rn \cdot wn'),$$

means for calculating a first provisional time period jp' necessary for accelerating/decelerating the robot tip from said provisional start velocity w(km−kp') to said provisional transit velocity wcb' and a second provisional time period jn' necessary for accelerating/decelerating the robot tip from said provisional transit velocity wcb' to said provisional end velocity w(km+kn'), requiring no axis of the robot to produce an acceleration/deceleration value beyond an allowable limit for said axis, by equations $$jp' = max(|wcb'_i - w_i(km-kp')|/amax_i) \text{ and}$$

$$jn' = max(|w_i(km+kn') - wcb'_i|/amax_i),$$

where $wcb'_i$, $w_i(km-kp')$ and $w_i(km+kn')$ represent i-th component of said provisional transit velocity wcb', said provisional start velocity w(km−kp') and said provisional end velocity w(km+kn') respectively, $amax_i$ representing a maximum value of i-th component of acceleration of the robot tip allowable for corresponding i-th axis of the robot and $max(x_i)$ being a function to give a maximum value among components $x_i$ (i=1, 2, ..., n) of a vector x, means for calculating a revised start time km−kp" and a revised end time km+kn" from said transit time km, said first provisional time period jp', said second provisional time period jn', said transit velocity parameter r and said coefficients rp and rn by equations $$km-kp'' = km - jp'/2 - (1-r) \cdot rp \cdot (rp \cdot jp' + rn \cdot jn')/2$$

and $$km+kn'' = km + jn'/2 + (1-r) \cdot rn \cdot (rp \cdot jp' + rn \cdot jn')/2,$$

means for calculating differences between said revised start time km−kp" and said provisional start time km−kp' stored in said register and between said revised end time km+kn" and said provisional end time km+kn' stored in said register, and means for rewriting values of said provisional start time km–kp' and said provisional end time km+kn' in said register with values of said revised start time km–kp" and said revised end time km+kn" respectively when any one of said differences is not smaller than a predetermind threshold value;

means for repeating processes in said means for revising until both of said defferences become samller than said predetermined thresholed value;

means for outputting said provisional start time km–kp', said provisional end time km+kn', said provisional start velocity w(km–kp'), said provisional end velocity w(km+kn'), said first provisional time period jp', said second provisional time period jn' and said provisional transit velocity wcb' as a start time km–kp, an end time km+kn, a start velocity w(km–kp), an end velocity w(km+kn), a first time period jp, a second time period jn and a transit velocity wcb when both of said differences become smaller than said predetermined threshold value;

means for calculating a first acceleration/deceleration value ap and a second acceleration/deceleration value an from said start velocity w(km–kp), said end velocity w(km+kn), said transit velocity wcb, said first time interval jp and said second time interval jn by equations $$ap=(wcb-w(km-kp))/jp \text{ and}$$

$$an=(w(km+kn)-wcb)/jn; \text{ and}$$

means for generating a trajectory after acceleration/deceleration processing as a second vector function of time to accelerate/decelerate the robot tip from said start time km–kp with said first acceleration/deceleration value ap for said first time period jp and with said second acceleration/deceleration value an for said second time period jn succeeding said first time period jp.

5. An apparatus for controlling a robot having a trajectory generator for generating an instructed trajectory of a robot tip as a first vector function of time, an acceleration/deceleration processor for processing said instructed trajectory to generate a trajectory after acceleration/deceleration processing as a second vector function of time wherein no axis of the robot is required to produce an acceleration/deceleration value beyond an allowable limit for said axis, a transit velocity parameter instruction board for specifying a transit velocity parameter r and coefficients rp and rn referred to by said acceleration/deceleration processor, and a servo unit for feedback-controlling the robot in accordance with said trajectory after acceleration/deceleration processing; said acceleration/deceleration processor comprising:

means for detecting a transit time km of said instructed trajectory when an axis of the robot being required to produce an acceleration/deceleration value beyond an allowable limit for said axis;

means for calculating a transit point by said first vector function from said transit time km;

means for setting an initial start time km–kp' before said transit time km and an initial end time km+kn' after said transit time km;

means for storing said initial start time km–kp' and said initial end time km+kn' in a register as a provisional start time km–kp' and a provisional end time km+kn' respectively;

means for revising said provisional start time km–kp' and said provisional end time km+kn', including, means for calculating a provisional start point and a provisional end point by said first vector function from said provisional start time km–kp' and said provisional end time km+kn' respectively, means for calculating a provisional start velocity w(km–kp') and a provisional end velocity w(km+kn') of the robot tip using said first vector function from said provisional start time km–kp' and said provisional end time km+kn' respectively, means for calculating a provisional transit velocity wcb' as a linear combination of said provisional start velocity w(km–kp') and said provisional end velocity w(km+kn')' referring to said transit velocity parameter r and said coefficients rp and rn, according to an equation $$wcb'=(1-r)(rp \cdot w(km-kp')+rn \cdot w(kp+kn'),$$

means for calculating a first provisional time period jp' necessary for accelerating/decelerating the robot tip from said provisional start velocity w(km–kp') to said provisional transit velocity wcb' and a second provisional time period jn' necessary for accelerating/decelerating the robot tip from said provisional transit velocity wcb' to said provisional end velocity w(km+kn'), requiring no axis of the robot to produce an acceleration/deceleration value beyond an allowable limit for said axis, by equations $$jp'=max(|wcb'_i-w_i(km-kp')|/amax_i) \text{ and}$$

$$jn'=max(|w_i(km+kn')-wcb'_i|/amax_i),$$

where wcb'$_i$, w$_i$(km–kp') and w$_i$(km+kn') represent i-th component of said provisional transit velocity wcb', said provisional start velocity w(km–kp') and said provisional end velocity w(km+kn') respectively, amax$_i$ representing a maximum value of i-th component of acceleration of the robot tip allowable for corresponding i-th axis of the robot and max(x$_i$) being a function to give a maximum value among components x$_i$ (i=1, 2, . . . , n) of a vector x, means for calculating a revised start time km–kp" and a revised end time km+kn" from said transit time km, said first provisional time period jp', said second provisional time period jn', said transit velocity parameter r and said coefficients rp and rn by equations $$km-kp"=km-jp'/2-(1-r) \cdot rp \cdot (rp \cdot jp'+rn \cdot jn')/2$$

and $$km+kn"=km+jn'/2+(1-r) \cdot rn \cdot (rp \cdot jp'+rn \cdot jn')/2,$$

means for calculating differences between said revised start time km–kp" and said provisional start time km–kp' stored in said register and between said revised end time km+kn" and said provisional end time km+kn' stored in said register, and means for rewriting values of said provisional start time km–kp' and said provisional end time km+kn' in said register with values of said revised start time km–kp" and said revised end time km+kn" respectively when any one of said differences is not smaller than a predetermind threshold value;

means for repeating processes in said means for revising until both of said defferences become samller than said predetermined thresholed value;

means for outputting said provisional start time km–kp', said provisional end time km+kn', said provisional start velocity w(km−kp'), said provisional end velocity w(km+kn'), said first provisional time period jp', said second provisional time period jn' and said provisional transit velocity wcb' as a start time km−kp, an end time km+kn, a start velocity w(km−kp), an end velocity w(km+kn), a first time period jp, a second time period jn and a transit velocity wcb when both of said differences become smaller than said predetermined threshold value;

means for calculating a first acceleration/deceleration value ap and a second acceleration/deceleration value an from said start velocity w(km−kp), said end velocity w(km+kn), said transit velocity wcb, said first time interval jp and said second time interval jn by equations $$ap=(wcb-w(km-kp))/jp \text{ and}$$

$$an=(w(km+kn)-wcb)/jn; \text{ and}$$

means for generating a trajectory after acceleration/deceleration processing as a second vector function of time to accelerate/decelerate the robot tip from said start time km−kp with said first acceleration/deceleration value ap for said first time period jp and with said second acceleration/deceleration value an for said second time period jn succeeding said first time period jp.

6. An apparatus for controlling a robot having a trajectory generator for generating an instructed trajectory of a robot tip as a first vector function of time, an acceleration/deceleration processor for processing said instructed trajectory to generate a trajectory after acceleration/deceleration processing as a second vector function of time wherein no axis of the robot is required to produce an acceleration/deceleration value beyond an allowable limit for said axis, a transit velocity parameter instruction board for specifying a transit velocity parameter r and coefficients rp and rn referred to by said acceleration/deceleration processor, and a servo unit for feedback-controlling the robot in accordance with said trajectory after acceleration/deceleration processing; said acceleration/deceleration processor comprising:

means for detecting a transit time km of said instructed trajectory when an axis of the robot being required to produce an acceleration/deceleration value beyond an allowable limit for said axis;

means for calculating a transit point by said first vector function from said transit time km;

means for calculating a provisional transit velocity wcb as a linear combination of a first velocity wp" of the robot tip just before said transit point and a second velocity wn" of the robot tip just after said transit point referring to said transit velocity parameter r and said coefficients rp and rn, according to an equation $$wcb=(1-r)(rp \cdot wp''+rn \cdot wn'');$$

means for calculating a first time period jp necessary for accelerating/decelerating the robot tip from said first velocity wp" to said transit velocity wcb and a second time period jn necessary for accelerating/decelerating the robot tip from said transit velocity wcb to said second velocity wn", requiring no axis of the robot to produce an acceleration/deceleration value beyond an allowable limit for said axis, by equations $$jp=max(|wcb_i-wp''_i|/amax_i) \text{ and}$$

$$jn=max(|wn''_i-wcb_i|/amax_i),$$

where $wcb_i$, $wp''_i$ and $wn''_i$ represent i-th component of said transit velocity wcb, said first velocity wp" and said second velocity wn respectively, $amax_i$ representing a maximum value of i-th component of acceleration of the robot tip allowable for corresponding i-th axis of the robot and $max(x_i)$ being a function to give a maximum value among components $x_i$ (i=1, 2, ..., n) of a vector x, means for calculating a start time km−kp and an end time km+kn from said transit time km, said first time period jp, said second time period jn, said transit velocity parameter r and said coefficients rp and rn by equations $$km-kp=km-jp/2-(1-r) \cdot rp \cdot (rp \cdot jp+rn \cdot jn)/2 \text{ and}$$

$$km+kn=km+jn/2+(1-r) \cdot rn \cdot (rp \cdot jp+rn \cdot jn)/2;$$

means for calculating a start velocity w(km−kp) and an end velocity w(km+kn) using said first vector function from said start time km−kp and said end time km+kn respectively;

means for calculating a first acceleration/deceleration value ap and a second acceleration/deceleration value an from said start velocity w(km−kp), said end velocity w(km+kn), said transit velocity wcb, said first time interval jp and said second time interval jn by equations $$ap=(wcb-w(km-kp))/jp \text{ and}$$

$$an=(w(km+kn)-wcb)/jn; \text{ and}$$

means for generating a trajectory after acceleration/deceleration processing as a second vector function of time to accelerate/decelerate the robot tip from said start time km−kp with said first acceleration/deceleration value ap for said first time period jp and with said second acceleration/deceleration value an for said second time period jn succeeding said first time period jp.

* * * * *